(12) United States Patent
Yamakawa et al.

(10) Patent No.: US 11,189,439 B2
(45) Date of Patent: Nov. 30, 2021

(54) POWER CONVERTING APPARATUS, MOTOR DRIVE APPARATUS, AND AIR CONDITIONER

(71) Applicant: Mitsubishi Electric Corporation, Tokyo (JP)

(72) Inventors: Takashi Yamakawa, Tokyo (JP); Shigeo Umehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/621,905

(22) PCT Filed: Aug. 4, 2017

(86) PCT No.: PCT/JP2017/028476
§ 371 (c)(1),
(2) Date: Dec. 12, 2019

(87) PCT Pub. No.: WO2019/026293
PCT Pub. Date: Feb. 7, 2019

(65) Prior Publication Data
US 2020/0168409 A1 May 28, 2020

(51) Int. Cl.
*H01H 11/04* (2006.01)
*H02M 7/12* (2006.01)

(52) U.S. Cl.
CPC .............. *H01H 11/04* (2013.01); *H02M 7/12* (2013.01)

(58) Field of Classification Search
CPC ...... H01H 11/04; H02M 7/12; H02M 1/4225; H02M 1/32; H02M 1/4233;
(Continued)

(56) References Cited

U.S. PATENT DOCUMENTS 10,938,318 B2 * 3/2021 Iwazaki ................ H02M 7/219
2011/0109283 A1 5/2011 Kapels et al.
(Continued)

FOREIGN PATENT DOCUMENTS

CN 105 871 244 A 8/2016
JP 2002-125362 A 4/2002
(Continued)

OTHER PUBLICATIONS

Office Action dated Sep. 15, 2020 from the Japanese patent office in application No. 2019-533876 (and English translation).
(Continued)

*Primary Examiner* — Adolf D Berhane
(74) *Attorney, Agent, or Firm* — Posz Law Group, PLC

(57) ABSTRACT

A power converting apparatus includes: a first arm including a switching element and a switching element connected in series; a second arm including a switching element and a switching element connected in series, the second arm being connected in parallel with the first arm; a reactor having one end connected to the switching element and the switching element and an opposite end connected to an alternating-current power supply; and a smoothing capacitor connected in parallel with the first arm and the second arm. The loss characteristic of the switching element and the second switching element that occurs in each switching event is better than the loss characteristic of the switching element and the switching element that occurs in each switching event.

19 Claims, 22 Drawing Sheets

(58) Field of Classification Search
CPC ....... H02M 2001/0009; H02M 3/1584; H02M 2001/322; H02M 7/219
See application file for complete search history.

(56) References Cited

U.S. PATENT DOCUMENTS

| | | | |
|---|---|---|---|
| 2011/0149622 A1* | 6/2011 | Lin | H02M 1/4208 363/124 |
| 2012/0235611 A1 | 9/2012 | Kuwabara et al. | |
| 2013/0257390 A1* | 10/2013 | Jin | H02M 1/4233 323/205 |
| 2013/0257392 A1 | 10/2013 | Yan et al. | |
| 2014/0292092 A1* | 10/2014 | Ichinose | H02J 50/12 307/104 |
| 2016/0028304 A1 | 1/2016 | O'Day et al. | |
| 2018/0048243 A1 | 2/2018 | Takabayashi | |
| 2018/0367024 A1* | 12/2018 | Kim | H02M 5/451 |
| 2020/0127554 A1* | 4/2020 | Toyodome | H02M 7/12 |
| 2021/0203246 A1* | 7/2021 | Uemura | H02M 1/0009 |

FOREIGN PATENT DOCUMENTS

| | | |
|---|---|---|
| JP | 2003-88098 A | 3/2003 |
| JP | 2008-125310 A | 5/2008 |
| JP | 2009-296798 A | 12/2009 |
| JP | 2011-160656 A | 8/2011 |
| JP | 2012-125018 A | 6/2012 |
| JP | 2012-186957 A | 9/2012 |
| JP | 2012-200042 A | 10/2012 |
| JP | 2012-231671 A | 11/2012 |
| JP | 2014-090570 A | 5/2014 |
| JP | 2014-099946 A | 5/2014 |
| JP | 2014-183157 A | 9/2014 |
| JP | 2015-061322 A | 3/2015 |
| JP | 2016-220378 A | 12/2016 |
| JP | 2017-55465 A | 3/2017 |
| JP | 2017-77101 A | 4/2017 |
| WO | 2016/170586 A1 | 10/2016 |
| WO | 2018/073874 A1 | 4/2018 |
| WO | 2018/073875 A1 | 4/2018 |

OTHER PUBLICATIONS

International Search Report of the International Searching Authority dated Sep. 26, 2017 for the corresponding International application No. PCT/JP2017/028476 (and English translation).
Extended European Search Report dated Aug. 7, 2020 issued in corresponding EP patent application No. 17920007.6.
Partial Supplementary European Search Report (R. 164(1) EPC) dated May 28, 2020 issued on corresponding EP application No. 17920007.6.
Notice of Opposition dated Jul. 15, 2021 in the corresponding JP patent application No. 6818892.
Notice of Reasons for Revocation dated Oct. 6, 2021 from the JP patent office in application No. 2019-533876 (registration No. 6818392) with an English machine translation.

* cited by examiner

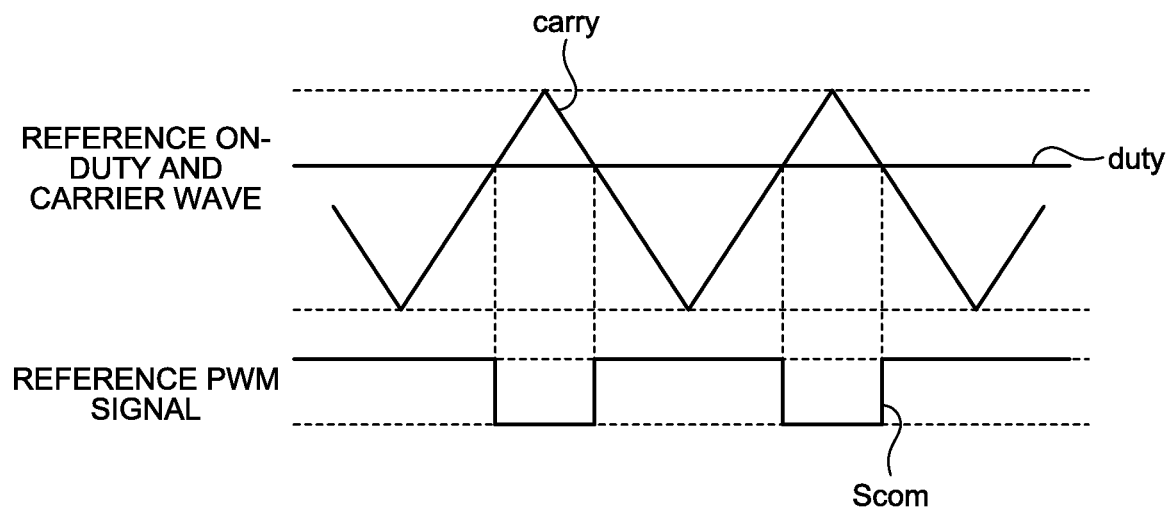
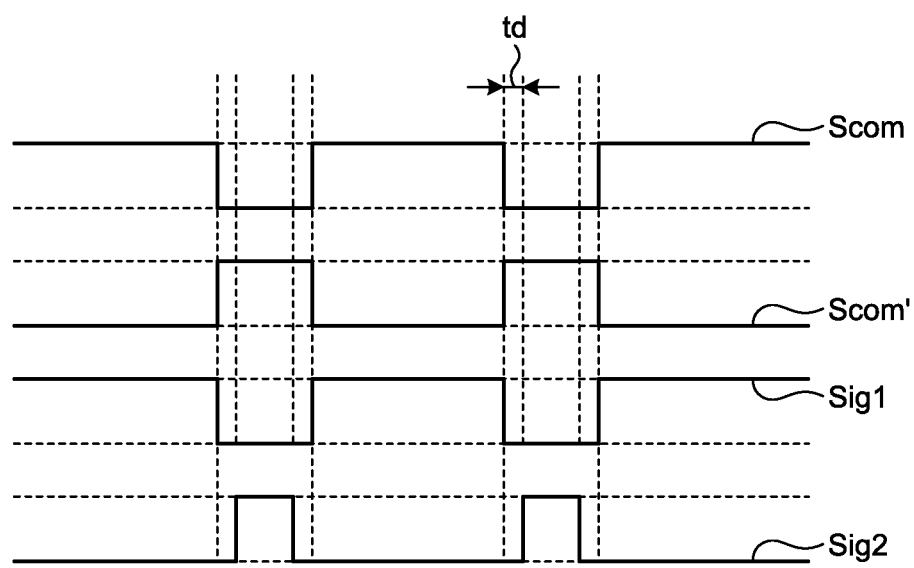

POWER CONVERTING APPARATUS, MOTOR DRIVE APPARATUS, AND AIR CONDITIONER

CROSS REFERENCE TO RELATED APPLICATION

This application is a U.S. national stage application of PCT/JP2017/028476 filed on Aug. 4, 2017, the contents of which are incorporated herein by reference.

FIELD

The present invention relates to a power converting apparatus that converts alternating-current power supplied from an alternating-current power supply into direct-current power, and to a motor drive apparatus and an air conditioner including the power converting apparatus.

BACKGROUND

A power supply current which is a current supplied from a power supply includes a harmonic current. The harmonic current is a frequency component having a frequency higher than the fundamental frequency. In order to prevent harmonic currents from causing a failure, international regulations are imposed on electronic devices that generate harmonic currents. To comply with the regulations, converters are designed to perform alternating-current (AC) or direct-current (DC) chopping to reduce the harmonic current contained in the power supply current.

Specifically, a full bridge converter including a rectifier circuit made up of switching elements has been considered as a loss reduction technique based on AC chopping. Patent Literature 1 discloses a loss reduction technique. The technique disclosed in Patent Literature 1 provides a full bridge circuit including a first arm for controlling the power supply current, and a second arm having switching elements that are switched in accordance with the power supply voltage polarity.

CITATION LIST

Patent Literature

Patent Literature 1: Japanese Patent Application Laid-open No. 2014-099946

SUMMARY

Technical Problem

For the technique disclosed in Patent Literature 1, the switching frequencies of the switching elements making up the first arm that controls the power supply current is higher than the switching frequencies of the switching elements making up the second arm that performs switching in accordance with the power supply voltage polarity. Generally, since switching elements having equal losses per switching event are used for the first arm and the second arm, the first arm and the second arm produce equal losses per switching event. For this reason, unfortunately, the technique disclosed in Patent Literature 1 causes significant unevenness of heat generation between the first arm in which switching events occur frequently and the second arm in which switching events occur less frequently. If the junction temperature of a semiconductor of a switching element exceeds an allowable value, normal operation may be disabled. For the technique disclosed in Patent Literature 1, thus, there is a problem of difficulty in achieving a high output unless heat dissipation measures are taken to enable the first arm to continue its normal operation.

The present invention has been made in view of the above, and an object thereof is to obtain a power converting apparatus capable of reducing the unevenness of heat generation between arms and achieving a high output.

Solution to Problem

In order to solve the problem described above and achieve the object, a power converting apparatus for converting alternating-current power supplied from an alternating-current power supply into direct-current power, the power converting apparatus comprising: a first wire and a second wire each connected to the alternating-current power supply; a first reactor disposed on the first wire; and a first arm including a first switching element, a second switching element, and a third wire including a first connection point, the first switching element and the second switching element being connected in series by the third wire, the first connection point being connected to the first reactor by the first wire. The apparatus further comprises a second arm connected in parallel with the first arm, the second arm including a third switching element, a fourth switching element, and a fourth wire including a second connection point, the third switching element and the fourth switching element being connected in series by the fourth wire, the second connection point being connected to the alternating-current power supply by the second wire. The apparatus further comprises a capacitor connected in parallel with the second arm. Loss characteristics of the first switching element and the second switching element that occur in each switching event is better than loss characteristics of the third switching element and the fourth switching element that occur in each switching event.

Advantageous Effects of Invention

The power converting apparatus according to the present invention can achieve the effect of reducing the unevenness of the heat generation between the arms and achieving the high output.

BRIEF DESCRIPTION OF DRAWINGS

FIG. 16 is a diagram illustrating examples of the reference on-duty, the carrier wave, and the reference pulse width modulation (PWM) signal of FIG. 15.

FIG. 17 is a diagram illustrating examples of the reference PWM signal, the inverted PWM signal, the first PWM signal, and the second PWM signal of FIG. 15.

DESCRIPTION OF EMBODIMENTS

Hereinafter, a power converting apparatus, a motor drive apparatus, and an air conditioner according to embodiments of the present invention will be described in detail based on the drawings. The present invention is not limited to the embodiments.

First Embodiment

Figure 1:
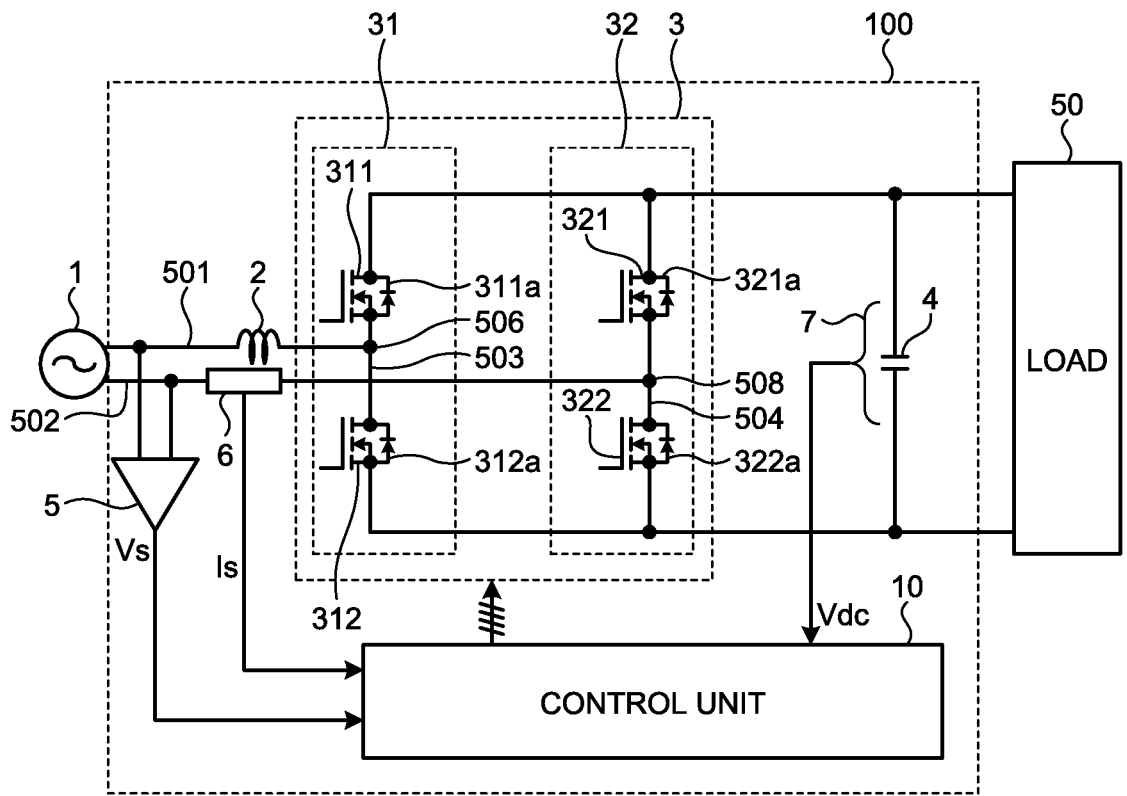
FIG. 1 is a diagram illustrating an exemplary configuration of a power converting apparatus according to a first embodiment.

FIG. 1 is a diagram illustrating an exemplary configuration of a power converting apparatus according to the first embodiment. The power converting apparatus 100 according to the first embodiment is a power supply apparatus having an AC-DC conversion function of converting alternating-current power supplied from an alternating-current power supply 1, into direct-current power and applying the direct-current power to a load 50. As illustrated in FIG. 1, the power converting apparatus 100 includes a reactor 2 which is a first reactor, a bridge circuit 3, a smoothing capacitor 4, a power supply voltage detecting unit 5, a power supply current detecting unit 6, a bus voltage detecting unit 7, and a control unit 10.

The bridge circuit 3 includes a first arm 31 which is a first circuit and a second arm 32 which is a second circuit. The first arm 31 includes a switching element 311 and a switching element 312 connected in series. A parasitic diode 311a is formed in the switching element 311. The parasitic diode 311a is connected in parallel between the drain and the source of the switching element 311. A parasitic diode 312a is formed in the switching element 312. The parasitic diode 312a is connected in parallel between the drain and the source of the switching element 312. Each of the parasitic diodes 311a and 312a is used as a freewheeling diode.

The second arm 32 includes a switching element 321 and a switching element 322 connected in series. The second arm 32 is connected in parallel with the first arm 31. A parasitic diode 321a is formed in the switching element 321. The parasitic diode 321a is connected in parallel between the drain and the source of the switching element 321. A parasitic diode 322a is formed in the switching element 322. The parasitic diode 322a is connected in parallel between the drain and the source of the switching element 322. Each of the parasitic diodes 321a and 322a is used as a freewheeling diode.

More specifically, the power converting apparatus 100 includes a first wire 501, a second wire 502, and a reactor 2 disposed on the first wire 501. Each of the first and second wires is connected to the alternating-current power supply 1. The first arm 31 includes the switching element 311 which is a first switching element, the switching element 312 which is a second switching element, and a third wire 503 including a first connection point 506. The switching element 311 and the switching element 312 are connected in series by the third wire 503. The first wire 501 is connected to the first connection point 506. The first connection point 506 is connected to the alternating-current power supply 1 via the first wire 501 and the reactor 2.

The second arm 32 includes the switching element 321 which is a third switching element, the switching element 322 which is a fourth switching element, and a fourth wire 504 including a second connection point 508. The switching element 321 and the switching element 322 are connected in series by the fourth wire 504. The second wire 502 is connected to the second connection point 508. The second connection point 508 is connected to the alternating-current power supply 1 via the second wire 502. The smoothing capacitor 4, which is a capacitor, is connected in parallel with the second arm 32.

The switching elements 311, 312, 321, and 322 are made of MOSFETs. MOSFETs formed of wide bandgap (WBG) semiconductors such as gallium nitride (GaN), silicon carbide (SiC), diamond, or aluminum nitride can be used as the switching elements 311, 312, 321, and 322. The use of wide bandgap semiconductors for the switching elements 311, 312, 321, and 322 raises the withstanding voltage property and allowable current density, whereby the module can be reduced in size. A heat dissipation fin of a heat dissipation unit can also be reduced in size since wide bandgap semiconductors have high heat resistance properties.

The control unit 10 generates drive pulses for operating the switching elements 311, 312, 321, and 322 of the bridge circuit 3 on the basis of the signals output from the power supply voltage detecting unit 5, the power supply current detecting unit 6, and the bus voltage detecting unit 7. The power supply voltage detecting unit 5 detects a power supply voltage Vs, which is the voltage output from the alternating-current power supply 1, and outputs, to the control unit 10, an electric signal indicating the detection result. The power supply current detecting unit 6 detects a power supply current Is, which is the current output from the alternating-current power supply 1, and outputs, to the control unit 10, an electrical signal indicating the detection result. The bus voltage detecting unit 7 detects a bus voltage Vdc and outputs the bus voltage Vdc to the control unit 10. The bus voltage Vdc is the voltage output from the bridge circuit 3 and smoothed by the smoothing capacitor 4.

Next, the basic operation of the power converting apparatus 100 according to the first embodiment will be described. The switching elements 311 and 321 connected to the positive side of the alternating-current power supply 1, that is, the positive electrode terminal of the alternating-current power supply 1, may be hereinafter referred to as upper switching elements. Similarly, the switching elements 312 and 322 connected to the negative side of the alternating-current power supply 1, that is, the negative electrode terminal of the alternating-current power supply 1, may be referred to as lower switching elements.

In the first arm 31, the upper switching element and the lower switching element operate complementarily. That is, when one of the upper switching element and the lower switching element is in an on state, the other is an off state. The switching elements 311 and 312, which make up the first arm 31, are driven by PWM signals generated by the control unit 10 as described later. The ON/OFF operation of the switching elements 311 and 312, which is performed in accordance with PWM signals, is hereinafter also referred to as switching operation.

The switching elements 321 and 322, which make up the second arm 32, are turned on or off by drive signals generated by the control unit 10. Basically, the switching elements 321 and 322 are placed in the on or off state in accordance with the power supply voltage polarity, which is the polarity of the voltage output from the alternating-current power supply 1. More specifically, when the power supply voltage polarity is positive, the switching element 322 is in the on state and the switching element 321 is in the off state. When the power supply voltage polarity is negative, the switching element 321 is in the on state and the switching element 322 is in the off state. However, as described later, in the first embodiment, in order to prevent the smoothing capacitor 4 from being short-circuited through the alternating-current power supply 1 and the reactor 2, the switching element 322 and the switching element 321 are both turned off when the absolute value of the power supply current Is output from the alternating-current power supply 1 is equal to or less than a threshold. Alternatively, in order to prevent the smoothing capacitor 4 from being short-circuited through the alternating-current power supply 1 and the reactor 2, the switching element 312 and the switching element 311 may both be turned off when the absolute value of the power supply current Is output from the alternating-current power supply 1 is equal to or less than the threshold. The threshold, which is compared with the absolute value of the power supply current Is, is hereinafter referred to as a current threshold. Short-circuiting of the smoothing capacitor 4 is hereinafter referred to as a capacitor short circuit. A capacitor short circuit is a state in which the energy stored in the smoothing capacitor 4 is released and the current is regenerated back to the alternating-current power supply 1.

Next, the relationship between the states of the switching elements in the first embodiment and current paths through the power converting apparatus 100 according to the first embodiment will be described. Before the description, the structure of a MOSFET will be described with reference to FIG. 2.

Figure 2:
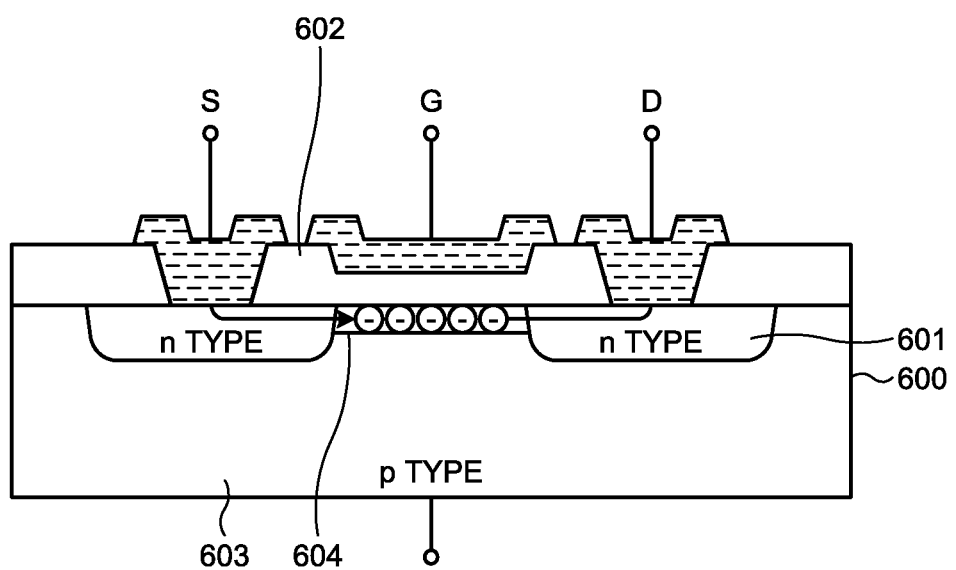
FIG. 2 is a schematic cross-sectional diagram illustrating a schematic structure of a metal-oxide-semiconductor field-effect transistor (MOSFET).

FIG. 2 is a schematic cross-sectional diagram illustrating a schematic structure of a MOSFET. In FIG. 2, an n-type MOSFET is illustrated. In the case of the n-type MOSFET, a p-type semiconductor substrate 600 is used as illustrated in FIG. 2. A source electrode S, a drain electrode D, and a gate electrode G are formed on the semiconductor substrate 600. The substrate 600 have parts contacting the source electrode S and the drain electrode D, and high-concentration impurities are ion-implanted into these parts to thereby form n-type regions 601. The semiconductor substrate 600 also has a portion having the n-type region 601 not formed therein, and an oxide insulating film 602 is formed between such a no-n-type-region-formed portion and the gate electrode G. That is, the oxide insulating film 602 is interposed between the gate electrode G and a p-type region 603 of the semiconductor substrate 600.

When a positive voltage is applied to the gate electrode G, electrons are attracted to the interface between the p-type region 603 of the semiconductor substrate 600 and the oxide insulating film 602, and the interface becomes negatively charged. The place where electrons gather provides a greater density of electrons than the hole density. As a result, this place becomes n-type. This n-type portion serves as a current path, which is called a channel 604. The channel 604 is an n-type channel in the example of FIG. 2. When the MOSFET is controlled such that the MOSFET becomes the on state, the flow of current through the channel 604 is larger than the flow of current through the parasitic diode formed in the p-type region 603.

Figure 3:
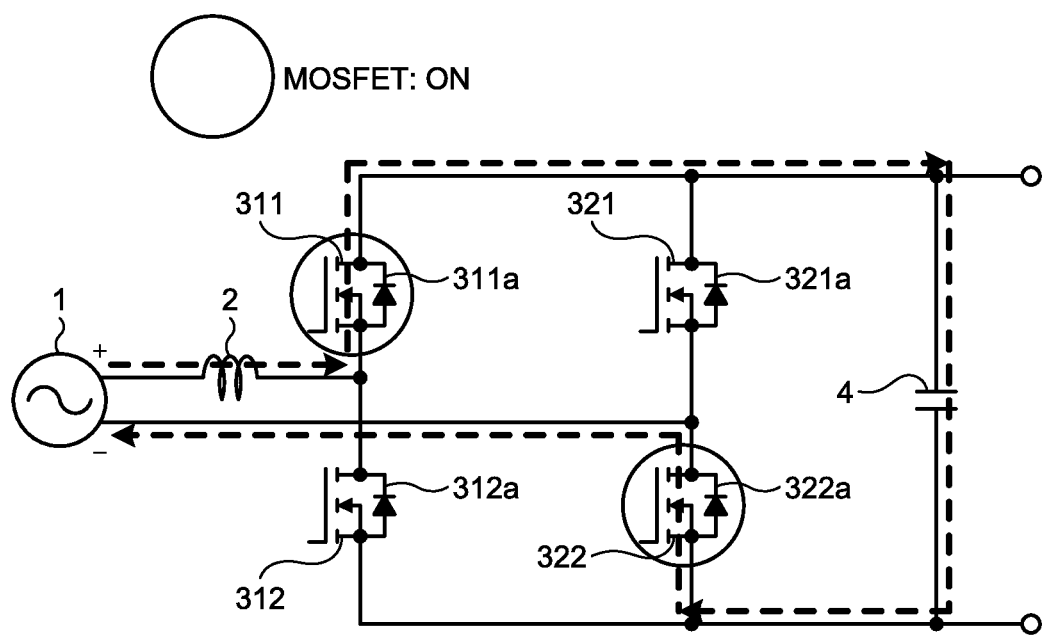
FIG. 3 is a first diagram illustrating a current path through the power converting apparatus according to the first embodiment when an absolute value of a power supply current is larger than a current threshold and a power supply voltage polarity is positive.

FIG. 3 is a first diagram illustrating a current path through the power converting apparatus according to the first embodiment when the absolute value of the power supply current is larger than the current threshold and the power supply voltage polarity is positive. In FIG. 3, the power supply voltage polarity is positive, the switching element 311 and the switching element 322 are in the on states, and the switching element 312 and the switching element 321 are in the off states. Under this condition, the current flows through the alternating-current power supply 1, the reactor 2, the switching element 311, the smoothing capacitor 4, the switching element 322, and the alternating-current power supply 1 in this order. In this manner, in the first embodiment, the current does not flow through the parasitic diode 311a and the parasitic diode 322a but flows through the channel of each of the switching element 311 and the switching element 322, whereby synchronous rectification operation is performed.

Figure 4:
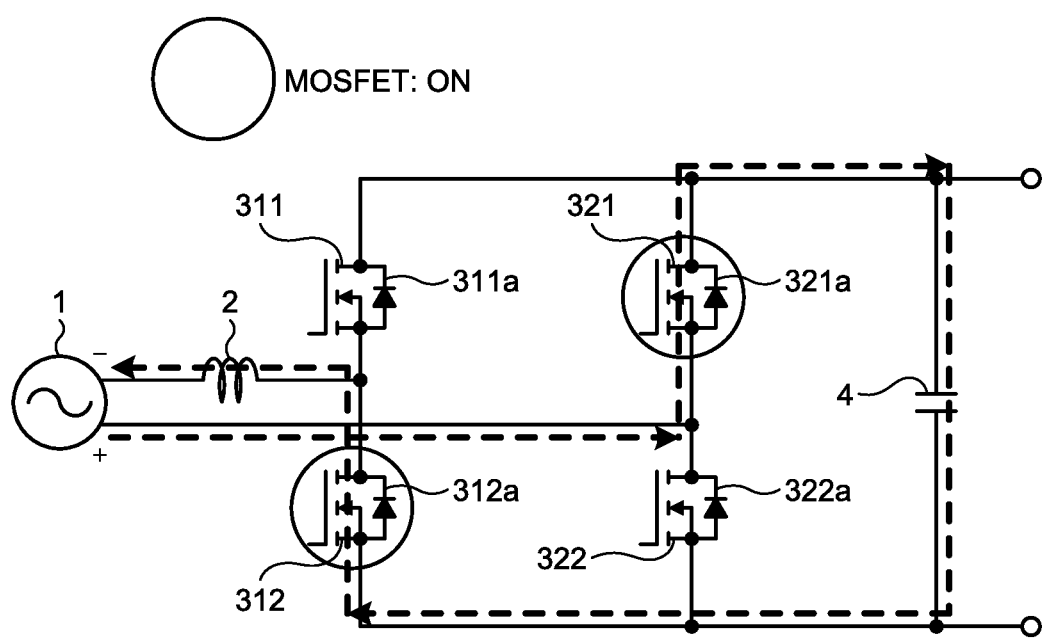
FIG. 4 is a first diagram illustrating a current path through the power converting apparatus according to the first embodiment when the absolute value of the power supply current is larger than the current threshold and the power supply voltage polarity is negative.

FIG. 4 is a first diagram illustrating a current path through the power converting apparatus according to the first embodiment when the absolute value of the power supply current is larger than the current threshold and the power supply voltage polarity is negative. In FIG. 4, the power supply voltage polarity is negative, the switching element 312 and the switching element 321 are in the on states, and the switching element 311 and the switching element 322 are in the off states. Under this condition, the current flows through the alternating-current power supply 1, the switching element 321, the smoothing capacitor 4, the switching element 312, the reactor 2, and the alternating-current power supply 1 in this order. In this manner, in the first embodiment, the current does not flow through the parasitic diode 321a and the parasitic diode 312a but flows through the channel of each of the switching element 321 and the switching element 312, whereby synchronous rectification operation is performed.

Figure 5:
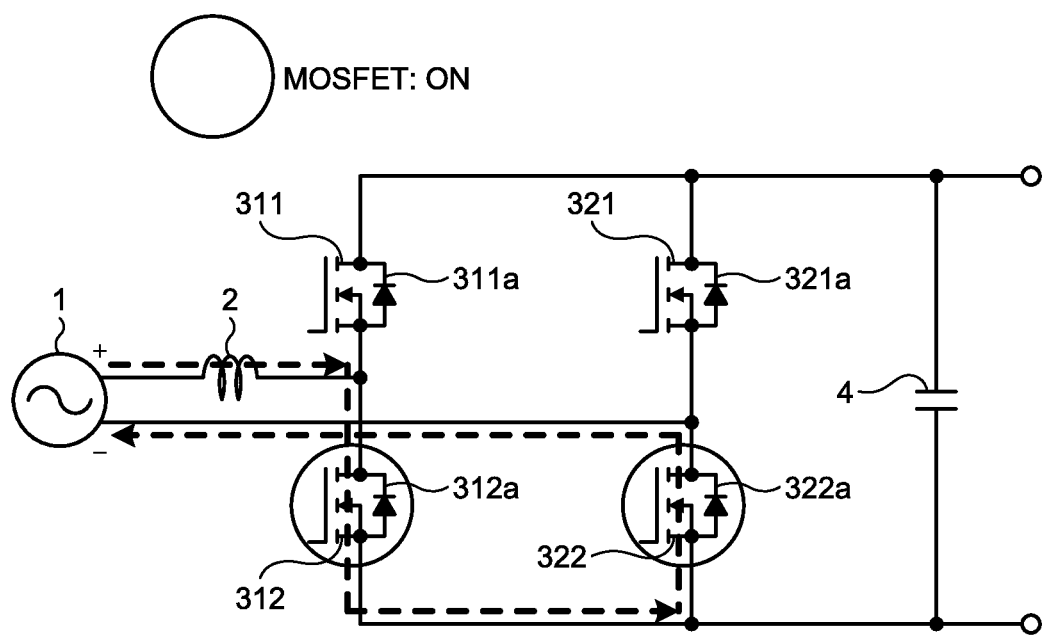
FIG. 5 is a second diagram illustrating a current path through the power converting apparatus according to the first embodiment when the absolute value of the power supply current is larger than the current threshold and the power supply voltage polarity is positive.

FIG. 5 is a second diagram illustrating a current path through the power converting apparatus according to the first embodiment when the absolute value of the power supply current is larger than the current threshold and the power supply voltage polarity is positive. In FIG. 5, the power supply voltage polarity is positive, the switching element 312 and the switching element 322 are in the on states, and the switching element 311 and the switching element 321 are in the off states. Under this condition, the current flows through the alternating-current power supply 1, the reactor 2, the switching element 312, the switching element 322, and the alternating-current power supply 1 in this order, and a power supply short-circuit path that does not include the smoothing capacitor 4 is formed. In this manner, in the first embodiment, the current does not flow through the parasitic diode 312a and the parasitic diode 322a but flows through the channel of each of the switching element 312 and the switching element 322, whereby the power supply short-circuit path is formed.

Figure 6:
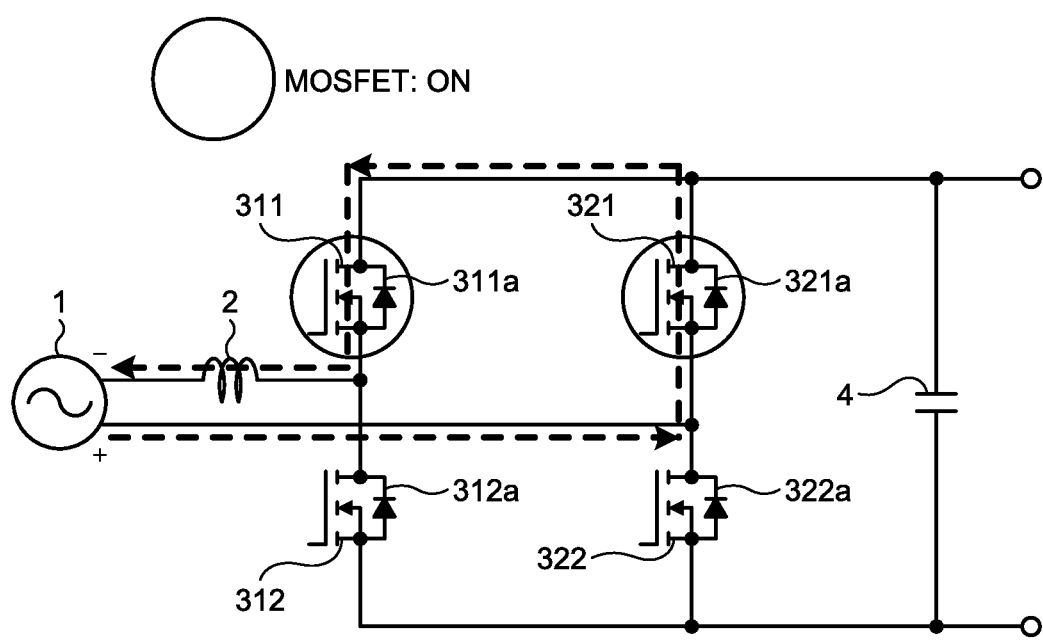
FIG. 6 is a second diagram illustrating a current path through the power converting apparatus according to the first embodiment when the absolute value of the power supply current is larger than the current threshold and the power supply voltage polarity is negative.

FIG. 6 is a second diagram illustrating a current path through the power converting apparatus according to the first embodiment when the absolute value of the power supply current is larger than the current threshold and the power supply voltage polarity is negative. In FIG. 6, the power supply voltage polarity is negative, the switching element 311 and the switching element 321 are in the on states, and the switching element 312 and the switching element 322 are in the off states. Under this condition, the current flows through the alternating-current power supply 1, the switching element 321, the switching element 311, the reactor 2, and the alternating-current power supply 1 in this order, and a power supply short-circuit path that does not include the smoothing capacitor 4 is formed. In this manner, in the first embodiment, the current does not flow through the parasitic diode 311a and the parasitic diode 321a but flows through the channel of each of the switching element 311 and the switching element 321, whereby the power supply short-circuit path is formed.

The control unit 10 can control the values of the power supply current Is and the bus voltage Vdc by controlling switching between the current paths described above.

However, if the switching element 311 and the switching element 322 are turned on when the power supply current Is is not flowing, a capacitor short circuit through the alternating-current power supply 1 and the reactor 2 occurs. This causes the current to flow in the direction opposite to the normal direction, which may cause problems such as power factor deterioration, harmonic component increase, element damage due to overcurrent, or loss increase.

Figure 7:
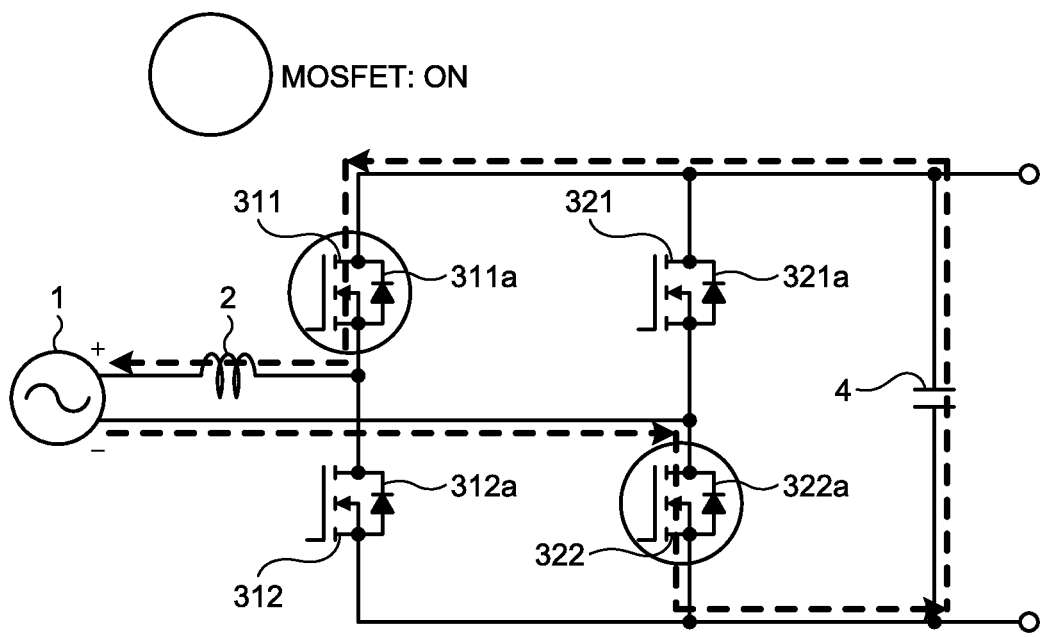
FIG. 7 is a first diagram for describing how a capacitor short circuit through an alternating-current power supply and a reactor occurs in the power converting apparatus according to the first embodiment.

FIG. 7 is a first diagram for describing how a capacitor short circuit through the alternating-current power supply and the reactor occurs in the power converting apparatus according to the first embodiment. FIG. 7 illustrates a condition where the power supply voltage polarity is positive, and the power supply current Is is not flowing. Since the power supply voltage polarity is positive, the current should normally flow through the alternating-current power supply 1, the reactor 2, the switching element 311, the smoothing capacitor 4, the switching element 322, and the alternating-current power supply 1 in this order, as illustrated in FIG. 3. However, if the switching element 311 and the switching element 322 are turned on when the power supply current Is is not flowing, as illustrated in FIG. 7, the current flows in the direction opposite to the normal direction, and a capacitor short circuit occurs. That is, the energy stored in the smoothing capacitor 4 is output to the alternating-current power supply 1.

Figure 8:
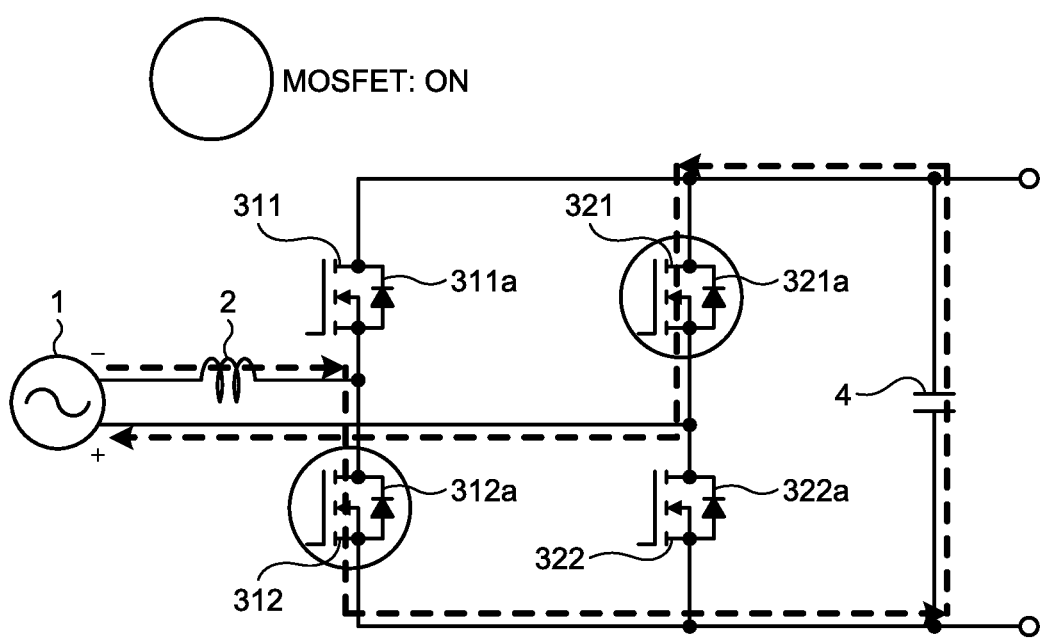
FIG. 8 is a second diagram for describing how a capacitor short circuit through the alternating-current power supply and the reactor occurs in the power converting apparatus according to the first embodiment.

FIG. 8 is a second diagram for describing how a capacitor short circuit through the alternating-current power supply and the reactor occurs in the power converting apparatus according to the first embodiment. FIG. 8 illustrates a condition where the power supply voltage polarity is negative, and the power supply current Is is not flowing. Since the power supply voltage polarity is negative, the current should normally flow through the alternating-current power supply 1, the switching element 321, the smoothing capacitor 4, the switching element 312, the reactor 2, and the alternating-current power supply 1 in this order, as illustrated in FIG. 4. However, if the switching element 312 and the switching element 321 are turned on when the power supply current Is is not flowing, as illustrated in FIG. 8, the current flows in the direction opposite to the normal direction, and a capacitor short circuit occurs.

In order to prevent a capacitor short circuit, the power converting apparatus 100 according to the first embodiment permits the switching elements 321 and 322 to be turned on when the absolute value of the power supply current Is is equal to or larger than the current threshold, but the power converting apparatus 100 turns off the switching elements 321 and 322 when the absolute value of the power supply current Is is less than the threshold. Consequently, it is possible to prevent a capacitor short circuit through the alternating-current power supply 1 and the reactor 2, thereby obtaining a highly reliable power converting apparatus.

Figure 9:
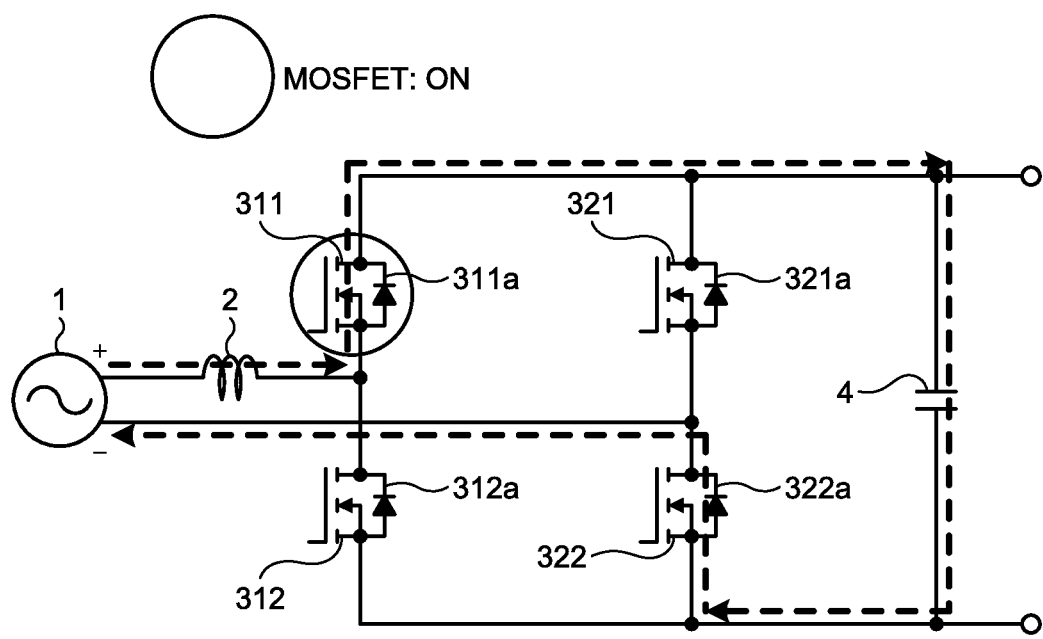
FIG. 9 is a first diagram illustrating a current path through the power converting apparatus according to the first embodiment when the absolute value of the power supply current is less than the current threshold and the power supply voltage polarity is positive.

FIG. 9 is a first diagram illustrating a current path through the power converting apparatus according to the first embodiment when the absolute value of the power supply current is less than the current threshold and the power supply voltage polarity is positive. In FIG. 9, the power supply voltage polarity is positive, the switching element 311 is in the on state, and the switching element 312, the switching element 321, and the switching element 322 are in the off states. In this case, the parasitic diode 322a of the switching element 322 functions as a freewheeling diode, and, as illustrated in FIG. 9, the current flows through the alternating-current power supply 1, the reactor 2, the switching element 311, the smoothing capacitor 4, the parasitic diode 322a, and the alternating-current power supply 1 in this order. Note that the absolute value of the power supply current Is may be any value that does not cause a malfunction. As the absolute value decreases, the synchronous rectification period becomes longer, so that the conduction loss can be more effectively reduced. If the absolute value of the power supply current Is is so small that no synchronous rectification operation is required, the switching element 311 may be turned off. With the switching element 311 in the off state, the gate drive power of the switching element 311 is not generated. Thus, the power consumption involved when the control unit 10 generates drive signals can be reduced significantly, as compared with the case of performing synchronous rectification operation.

Figure 10:
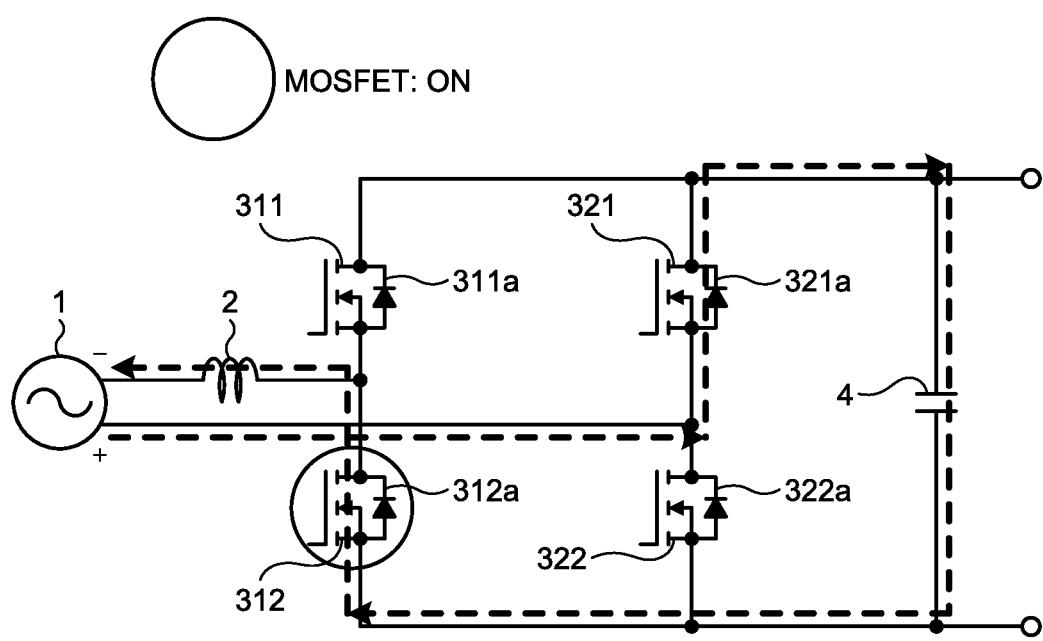
FIG. 10 is a first diagram illustrating a current path through the power converting apparatus according to the first embodiment when the absolute value of the power supply current is less than the current threshold and the power supply voltage polarity is negative.

FIG. 10 is a first diagram illustrating a current path through the power converting apparatus according to the first embodiment when the absolute value of the power supply current is less than the current threshold and the power supply voltage polarity is negative. In FIG. 10, the power supply voltage polarity is negative, the switching element 312 is in the on state, and the switching element 311, the switching element 321, and the switching element 322 are in the off states. In this case, the parasitic diode 321a of the switching element 321 functions as a freewheeling diode, and, as illustrated in FIG. 10, the current flows through the alternating-current power supply 1, the parasitic diode 321a, the smoothing capacitor 4, the switching element 312, the reactor 2, and the alternating-current power supply 1 in this order. Note that the absolute value of the power supply current Is may be any value that does not cause a malfunction. As the absolute value decreases, the synchronous rectification period becomes longer, so that the conduction loss can be more effectively reduced. If the absolute value of the power supply current Is is so small that no synchronous rectification operation is required, the switching element 312 may be turned off. With the switching element 312 in the off state, the gate drive power of the switching element 312 is not generated. Thus, the power consumption involved when the control unit 10 generates drive signals can be reduced significantly, as compared with the case of performing synchronous rectification operation.

Figure 11:
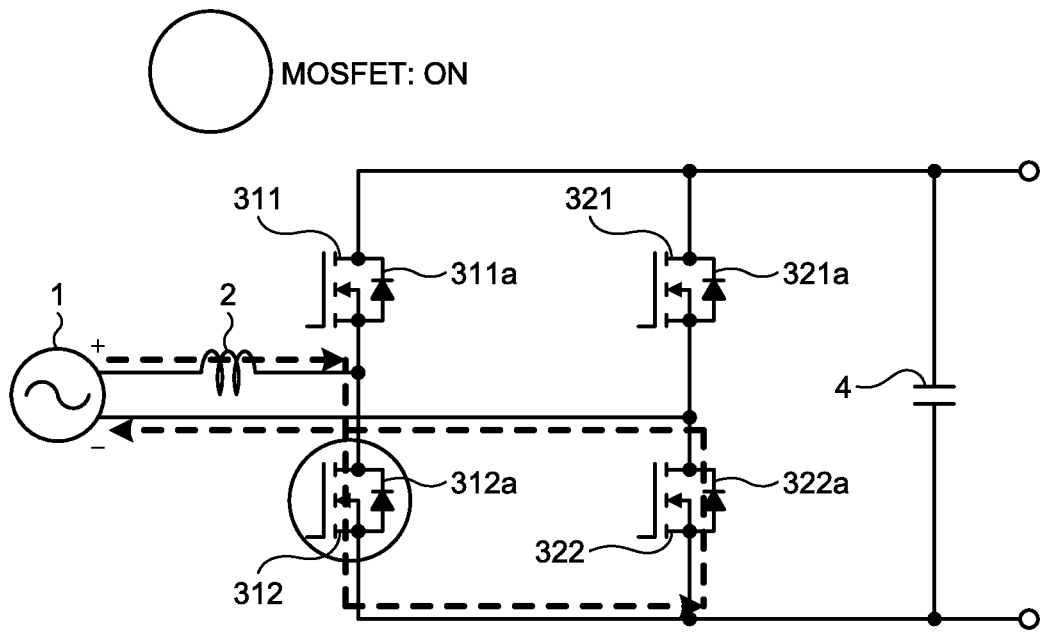
FIG. 11 is a second diagram illustrating a current path through the power converting apparatus according to the first embodiment when the absolute value of the power supply current is less than the current threshold and the power supply voltage polarity is positive.

FIG. 11 is a second diagram illustrating a current path through the power converting apparatus according to the first embodiment when the absolute value of the power supply current is less than the current threshold and the power supply voltage polarity is positive. In FIG. 11, the power supply voltage polarity is positive, the switching element 312 is in the on state, and the switching element 311, the switching element 321, and the switching element 322 are in the off states. In this case, the parasitic diode 322a of the switching element 322 functions as a freewheeling diode, and, as illustrated in FIG. 11, the current flows through the alternating-current power supply 1, the reactor 2, the switching element 312, the parasitic diode 322a, and the alternating-current power supply 1 in this order. In this case, since the short-circuit current flows, not only the switching element 312 but also the switching element 322 may be turned on even though the absolute value of the power supply current Is is less than the current threshold. In that case, since the drop voltage due to the ON resistance of the switching element 322 is less than the forward voltage of the parasitic diode 322a, the conduction loss in the switching element 322 is reduced.

Figure 12:
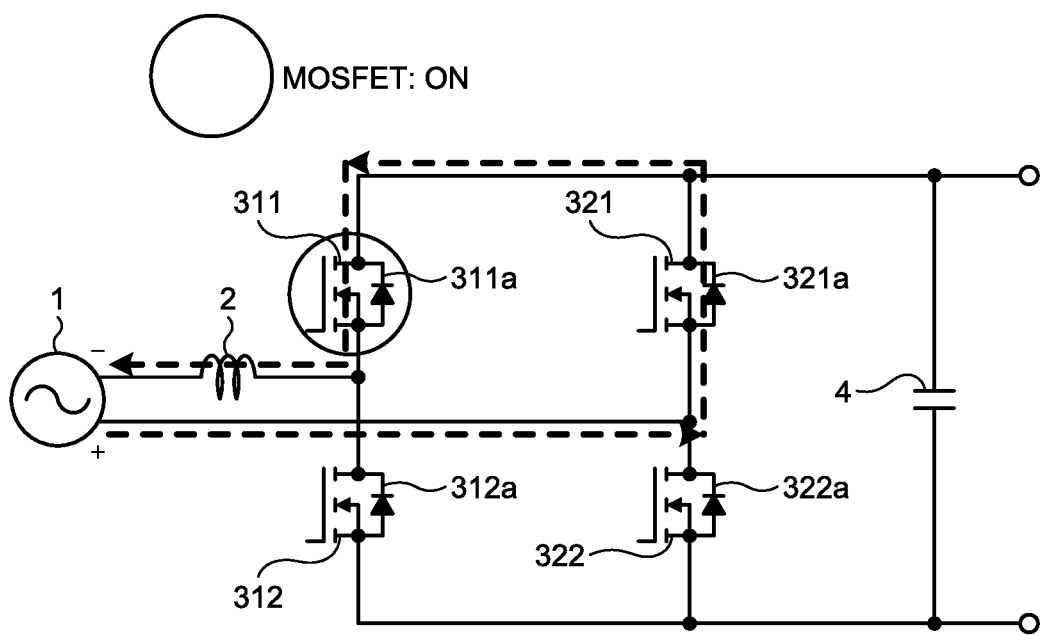
FIG. 12 is a second diagram illustrating a current path through the power converting apparatus according to the first embodiment when the absolute value of the power supply current is less than the current threshold and the power supply voltage polarity is negative.

FIG. 12 is a second diagram illustrating a current path through the power converting apparatus according to the first embodiment when the absolute value of the power supply current is less than the current threshold and the power supply voltage polarity is negative. In FIG. 12, the power supply voltage polarity is negative, the switching element 311 is in the on state, and the switching element 312, the switching element 321, and the switching element 322 are in the off states. In this case, the parasitic diode 321a of the switching element 321 functions as a freewheeling diode, and, as illustrated in FIG. 12, the current flows through the alternating-current power supply 1, the parasitic diode 321a, the switching element 311, the reactor 2, and the alternating-current power supply 1 in this order. In this case, since the short-circuit current flows, not only the switching element 311 but also the switching element 321 may be turned on even though the absolute value of the power supply current Is is less than the current threshold. In that case, since the drop voltage due to the ON resistance of the switching element 321 is less than the forward voltage of the parasitic diode 321a, the conduction loss in the switching element 321 is reduced.

Figure 13:
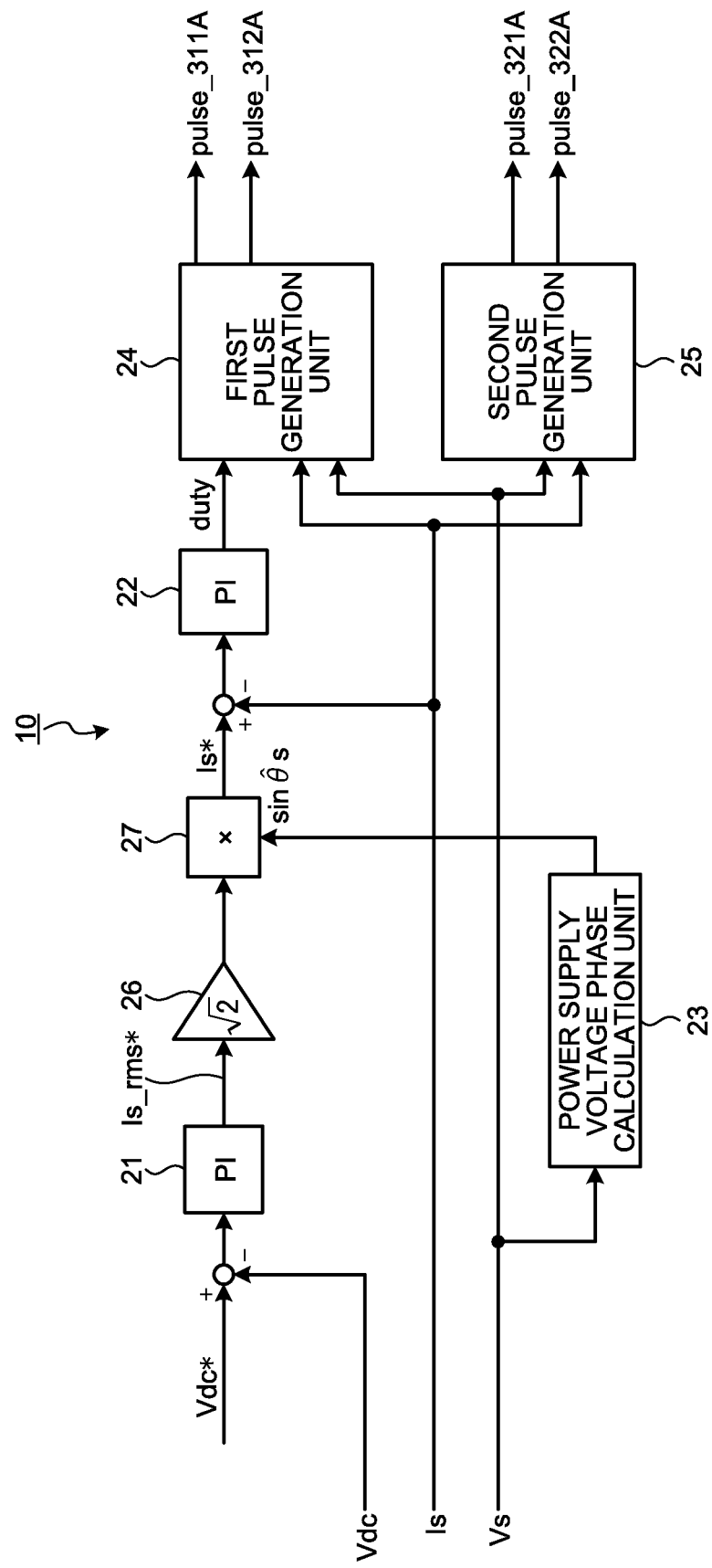
FIG. 13 is a diagram illustrating an exemplary configuration of a control unit of the power converting apparatus according to the first embodiment.

Next, the configuration of the control unit 10 of the power converting apparatus 100 according to the first embodiment will be described. FIG. 13 is a diagram illustrating an exemplary configuration of the control unit of the power converting apparatus according to the first embodiment. As illustrated in FIG. 13, the control unit 10 includes a power supply current command value control unit 21, an on-duty control unit 22, a power supply voltage phase calculation unit 23, a first pulse generation unit 24, a second pulse generation unit 25, a current command value calculation unit 26, and an instantaneous value command value calculation unit 27.

The power supply current command value control unit 21 calculates a current effective value command value Is_rms* from the bus voltage Vdc detected by the bus voltage detecting unit 7 and a bus voltage command value Vdc*. The bus voltage command value Vdc* may be set in advance, or may be input from the outside of the power converting apparatus 100. The power supply current command value control unit 21 calculates the current effective value command value Is_rms* using proportional integral control based on the difference between the bus voltage Vdc and the bus voltage command value Vdc*.

The current command value calculation unit 26 converts the current effective value command value Is_rms* into a sinusoidal command value and outputs the sinusoidal command value. The instantaneous value command value calculation unit 27 calculates a power supply current instantaneous value command value Is*, using the current effective value command value Is_rms* calculated by the current command value calculation unit 26 and a sine wave value sin θ^s calculated by the power supply voltage phase calculation unit 23.

The on-duty control unit 22 performs proportional integral control on the difference between the power supply current instantaneous value command value Is* calculated by the instantaneous value command value calculation unit 27 and the power supply current Is detected by the power supply current detecting unit 6, thereby calculating a reference on-duty "duty" for the switching elements 311 and 312.

Figure 14:
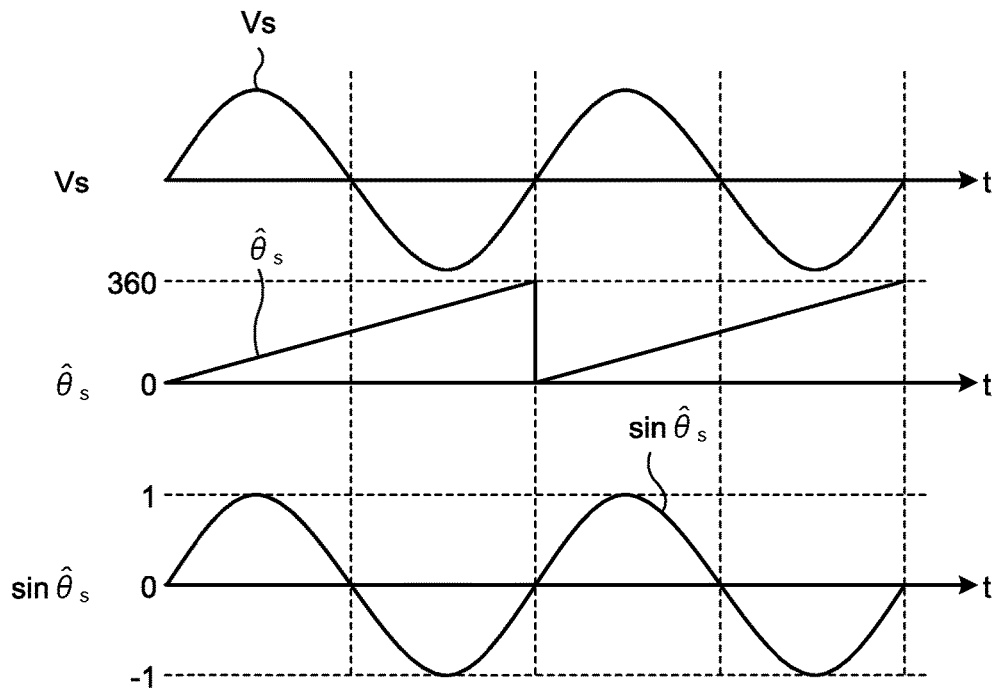
FIG. 14 is a diagram illustrating examples of the power supply voltage and the power supply voltage phase estimated value and the sine wave value, the power supply voltage phase estimated value and the sine wave value being calculated by a power supply voltage phase calculation unit illustrated in FIG. 13.

The power supply voltage phase calculation unit 23 calculates a power supply voltage phase estimated value θ^s and the sine wave value sin θ^s, using the power supply voltage Vs detected by the power supply voltage detecting unit 5. FIG. 14 is a diagram illustrating examples of the power supply voltage and the power supply voltage phase estimated value and the sine wave value, the power supply voltage phase estimated value and the sine wave value being calculated by the power supply voltage phase calculation unit illustrated in FIG. 13. In FIG. 14, the power supply voltage Vs, the power supply voltage phase estimated value θ^s, and the sine wave value sin θ^s are illustrated in order from the top.

The power supply voltage phase calculation unit 23 linearly increases the power supply voltage phase estimated value θ^s, detects a timing at which the power supply voltage Vs switches from negative to positive, and resets the power supply voltage phase estimated value θ^s to zero at this timing. Thus, under ideal conditions free from control delay and detection delay, the power supply voltage phase estimated value θ^s becomes 360°, that is, 0° at a timing when the power supply voltage Vs switches from negative to positive. The power supply voltage phase calculation unit 23 calculates the sine wave value sin θ^s on the basis of the calculated power supply voltage phase estimated value θ^s. In a case where the power supply voltage phase estimated value θ^s is reset using the interrupt function of a microcomputer, the power supply voltage phase calculation unit 23 resets the power supply voltage phase estimated value θ^s, using the signal output from a zero-cross detection circuit as an interrupt signal. The zero-cross detection circuit is a circuit that detects a timing at which the power supply voltage Vs switches from negative to positive. Note that the method for calculating the power supply voltage phase estimated value θ^s is not limited to the above-described example, and any method may be used.

Figure 15:
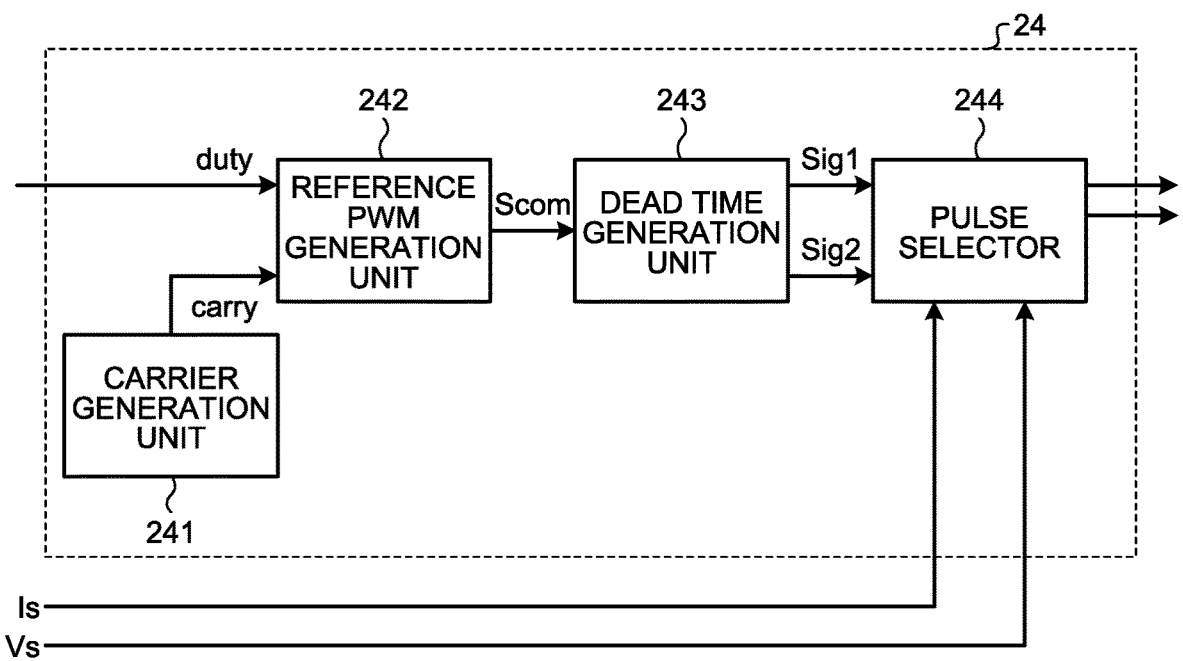
FIG. 15 is a diagram illustrating an exemplary configuration of a first pulse generation unit of the power converting apparatus according to the first embodiment.

FIG. 15 is a diagram illustrating an exemplary configuration of the first pulse generation unit of the power converting apparatus according to the first embodiment. The first pulse generation unit 24 includes a carrier generation unit 241, a reference PWM generation unit 242, a dead time generation unit 243, and a pulse selector 244.

The carrier generation unit 241 generates a carrier wave "carry" which is a carrier signal. The carrier wave "carry" is used to generate a reference PWM signal Scom. The carrier wave "carry" can be exemplified by a triangle wave having a peak value of "1" and a valley value of "0". The reference PWM signal Scom is a signal serving as a reference for PWM signals that are used to drive the switching elements 311, 312, 321, and 322. As described above, the first embodiment is premised on the complementary PWM control. Thus, a reference PWM signal is used to drive one of the switching elements of the first arm 31, and a PWM signal complementary to the reference PWM signal is used for the other switching element of the first arm 31.

The reference PWM generation unit 242 generates the reference PWM signal Scom by comparing the magnitude of the reference on-duty "duty" calculated by the on-duty control unit 22 illustrated in FIG. 13 and the magnitude of the carrier wave "carry". FIG. 16 is a diagram illustrating examples of the reference on-duty, the carrier wave, and the reference PWM signal of FIG. 15. As illustrated in FIG. 16, the reference PWM generation unit 242 generates the reference PWM signal Scom providing a value indicating ON when (reference on-duty "duty")>(carrier wave "carry") is satisfied, and generates the reference PWM signal Scom providing a value indicating OFF when (reference on-duty "duty")(carrier wave "carry") is satisfied. In the example of FIG. 16, a high active reference PWM signal Scom is depicted. The high active reference PWM signal Scom is a signal in which the high level indicates ON and the low level indicates OFF. Note that the signal generated by the reference PWM generation unit 242 is not limited to the high active reference PWM signal Scom, and may be a low active reference PWM signal Scom. The low active reference PWM signal Scom is a signal in which the high level indicates OFF and the low level indicates ON.

Referring back to FIG. 15, the dead time generation unit 243 generates and outputs two complementary signals: a first PWM signal Sig1 and a second PWM signal Sig2 on the basis of the reference PWM signal Scom. Specifically, the dead time generation unit 243 inverts the reference PWM signal Scom to generate an inverted PWM signal Scom'. Thereafter, the dead time generation unit 243 provides dead time for the reference PWM signal Scom and the inverted PWM signal Scom' to thereby generate the first PWM signal Sig1 and the second PWM signal Sig2.

That is, the dead time generation unit 243 generates the first PWM signal Sig1 and the second PWM signal Sig2 such that both the first PWM signal Sig1 and the second PWM signal Sig2 have values indicating OFF during the dead time. For example, the dead time generation unit 243 provides the first PWM signal Sig1 identical to the reference PWM signal Scom. The dead time generation unit 243 also generates the second PWM signal Sig2 by changing the signal value of the inverted PWM signal Scom' from ON to OFF during the dead time.

In a case where two switching elements of the same arm are driven by the reference PWM signal Scom and the inverted PWM signal Scom' generated by inverting the reference PWM signal Scom, there is ideally no period in which the two switching elements of the same arm are simultaneously in the on states. However, in general, a delay in the transition from the on state to the off state occurs, and a delay in the transition from the off state to the on state also occurs. These delays cause a period in which the two switching elements of the same arm are simultaneously in the on states, which may result in a short circuit between the two switching elements of the same arm. The dead time is a period provided for preventing the two switching elements of the same arm from being simultaneously in the on states even when a delay in the state transition occurs. The two PWM signals that drive the two switching elements of the same arm are both set to values indicating OFF during the dead time.

FIG. 17 is a diagram illustrating examples of the reference PWM signal, the inverted PWM signal, the first PWM signal, and the second PWM signal of FIG. 15. In FIG. 17, the reference PWM signal Scom, the inverted PWM signal Scom', the first PWM signal Sig1, and the second PWM signal Sig2 are illustrated in order from the top. In FIG. 17, when the inverted PWM signal Scom' has a value indicating ON, the second PWM signal Sig2 has a value indicating OFF during the dead time td. Note that the method for generating the dead time td described above is an example. The method of generating the dead time td is not limited to the example described above, and any method may be used.

Figure 18:
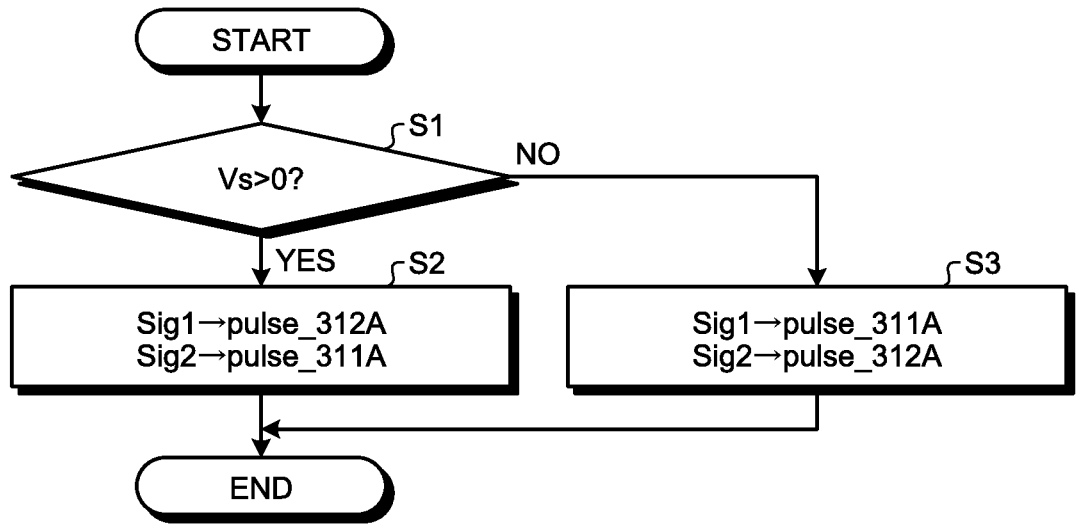
FIG. 18 is a flowchart illustrating an exemplary selection procedure in a pulse selector of the first pulse generation unit illustrated in FIG. 15.

Referring back to FIG. 15, the pulse selector 244 selects to which of the switching element 311 and the switching element 312 the first PWM signal Sig1 and the second PWM signal Sig2 output from the dead time generation unit 243 are individually transmitted. FIG. 18 is a flowchart illustrating an exemplary selection procedure in the pulse selector of the first pulse generation unit illustrated in FIG. 15. The pulse selector 244 first determines whether the polarity of the power supply voltage Vs is positive, that is, whether Vs>0 is satisfied (step S1). When the polarity of the power supply voltage Vs is positive (step S1: Yes), the pulse selector 244 transmits the first PWM signal Sig1 as pulse_312A to the switching element 312 and transmits the second PWM signal Sig2 as pulse_311A to the switching element 311 (step S2). This is because, when the power supply voltage Vs has positive polarity, each of the switching element 311 and the switching element 312 is turned on or off to thereby perform switching between the current path illustrated in FIG. 5 and the current path illustrated in FIG. 3. In other words, the switching operations of the switching element 311 and the switching element 312 control the bus voltage Vdc and the power supply current Is.

When the polarity of the power supply voltage Vs is negative (step S1: No), the pulse selector 244 transmits the first PWM signal Sig1 as pulse_311A to the switching element 311 and transmits the second PWM signal Sig2 as pulse_312A to the switching element 312 (step S3). This is because, when the power supply voltage Vs has negative polarity, each of the switching element 311 and the switching element 312 is turned on or off to thereby perform switching between the current path illustrated in FIG. 6 and the current path illustrated in FIG. 4. In other words, the switching operations of the switching element 311 and the switching element 312 control the bus voltage Vdc and the power supply current Is. The pulse selector 244 repeats the above operation each time the polarity of the power supply voltage Vs changes.

In the above manner, the first pulse generation unit 24 generates pulse_311A, which is a drive signal for the switching element 311, and pulse_312A, which is a drive signal for the switching element 312.

As described above, since the switching element 311 and the switching element 312 are controlled complementarily, the process for generating the inverted PWM signal Scom' from the reference PWM signal Scom can be implemented using a simple signal inversion process. Further, regardless of the power supply voltage polarity, outputting drive pulses substantially equally in one carrier and preventing short circuiting of the upper and lower arms can be easily achieved. Stable control can be implemented by simple processing.

In the power converting apparatus 100 according to the first embodiment, synchronous rectification control by the switching elements 311 and 312 of the first arm 31 can be implemented. For this reason, as illustrated in FIG. 19, the power converting apparatus 100 according to the first embodiment can reduce loss in the region where the switching element loss is smaller than the parasitic diode loss, i.e. the region where the current flowing through each of the switching element and the parasitic diode is small, whereby a highly efficient system can be obtained.

Figure 19:
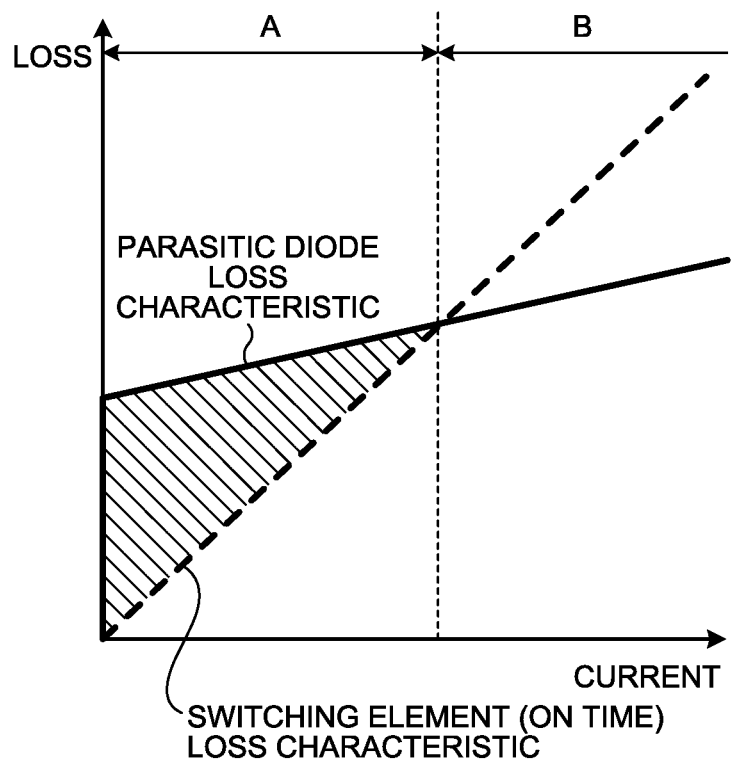
FIG. 19 is a schematic diagram illustrating the relationship among a current flowing through each of a switching element and a parasitic diode, a switching element loss, and a parasitic diode loss.

FIG. 19 is a schematic diagram illustrating the relationship among a current flowing through each of a switching element and a parasitic diode, a switching element loss, and a parasitic diode loss. The horizontal axis in FIG. 19 indicates the current that flows through the ON-state switching element and the current that flows through the parasitic diode. The vertical axis in FIG. 19 indicates the loss occurring when the current flows through the ON-state switching element and the loss occurring when the current flows through the parasitic diode. The solid line represents the loss characteristic of the parasitic diode. The loss characteristic of the parasitic diode indicates the relationship between the current flowing through the parasitic diode and the loss due to the ON resistance of the parasitic diode as the current flows through the parasitic diode. The dotted line represents the loss characteristic of the ON-state switching element. The loss characteristic indicates the relationship between the current flowing through the carrier of the switching element and the loss due to the ON resistance of the switching element as the current flows through the carrier. The region indicated by reference sign "A" indicates a region in which the current flowing through each of the switching element and the parasitic diode is small. The region indicated by reference sign "B" indicates a region in which the current flowing through each of the switching element and the parasitic diode is large. The boundary between region A and region B is equal to the current value at which the value of the loss occurring in the switching element is equal to the value of the loss occurring in the parasitic diode.

FIG. 19 indicates that stopping the complementary operation in region B where the switching element loss is higher than the parasitic diode loss makes it possible to prevent an increase in loss due to synchronous rectification control. That is, performing control for determining to conduct synchronous rectification control in accordance with the power supply current Is makes it possible to obtain a system that is efficient over the entire range of loads.

Figure 20:
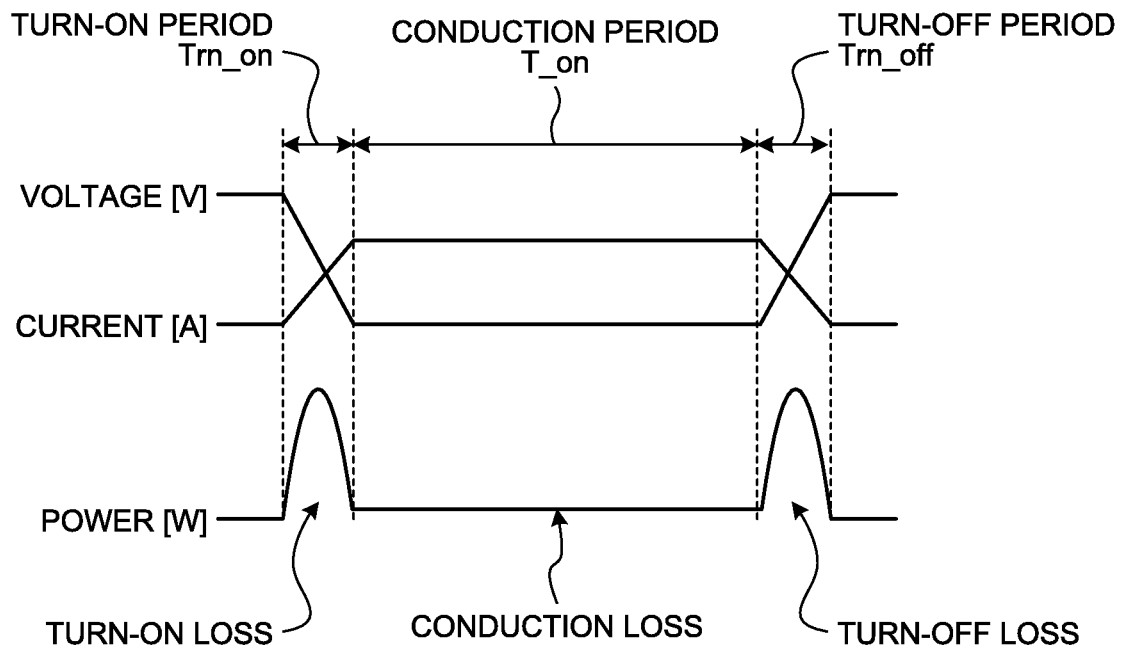
FIG. 20 is a first schematic diagram illustrating the relationship between among a voltage applied to a switching element of the power converting apparatus according to the first embodiment, a current flowing through the switching element, and a loss occurring in the switching element.

The loss occurring in a switching element will be described with reference to FIG. 20. FIG. 20 is a first schematic diagram illustrating the relationship among the voltage applied to a switching element of the power converting apparatus according to the first embodiment, the current flowing through the switching element, and the loss occurring in the switching element. In FIG. 20, the voltage applied to the switching element, the current flowing through the switching element, and the power are illustrated in order from the top. The voltage applied to the switching element is a drain-source voltage. The current flowing through the switching element is a drain-source current. The power corresponds to the loss occurring in the switching element.

The switching element loss includes a turn-on loss occurring in a turn-on period, a turn-off loss occurring in a turn-off period, a conduction loss occurring in a conduction period, and a recovery loss (not illustrated) due to turn-on. These losses are derived from the product of the drain-source voltage and the drain-source current. The turn-on loss and the turn-off loss are losses occurring depending on the switching characteristics. The turn-on loss and the turn-off loss decrease as the turn-on period and the turn-off period become shorter.

The conduction loss is a loss occurring when a current flows through the switching element, and is equal to the drain-source voltage characteristic with respect to the current during conduction, that is, the product of the ON resistance and the square of the current during conduction. For this reason, the conduction loss decreases as the ON resistance of the switching element decreases. The recovery loss occurs depending on the reverse recovery of the switching element, that is, the recovery current.

Figure 21:
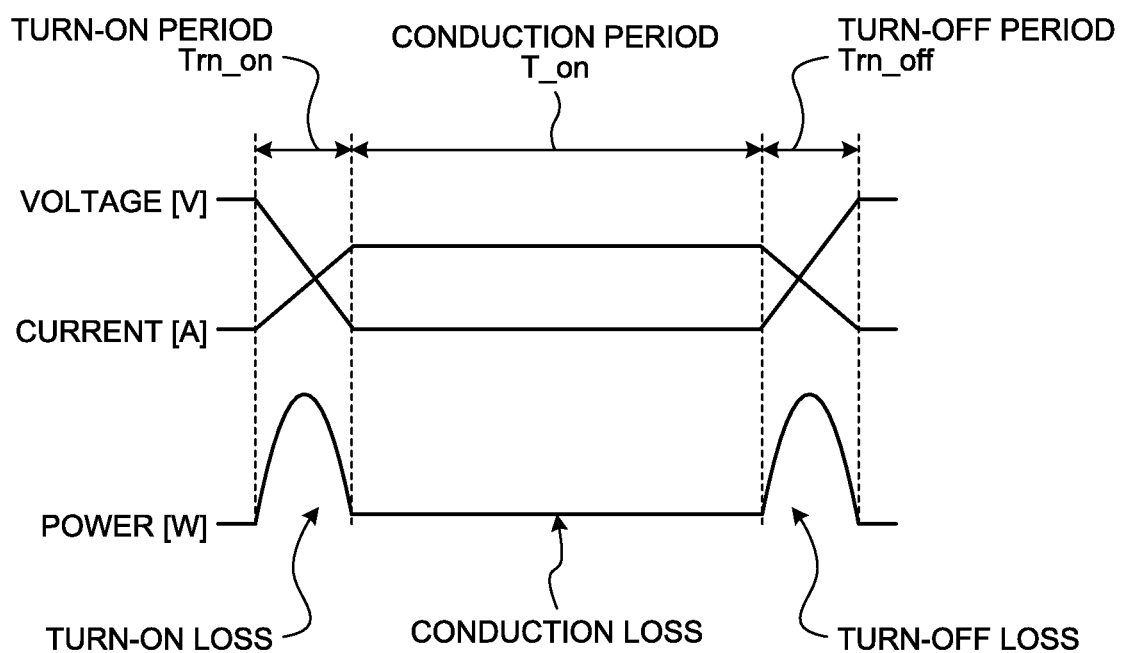
FIG. 21 is a second schematic diagram illustrating the relationship among the voltage applied to the switching element of the power converting apparatus according to the first embodiment, the current flowing through the switching element, and the loss occurring in the switching element.

FIG. 21 is a second schematic diagram illustrating the relationship among the voltage applied to the switching element of the power converting apparatus according to the first embodiment, the current flowing through the switching element, and the loss occurring in the switching element. FIG. 21 depicts a turn-on loss, a conduction loss, and a turn-off loss when the switching speed is lower than that in FIG. 20.

Figure 22:
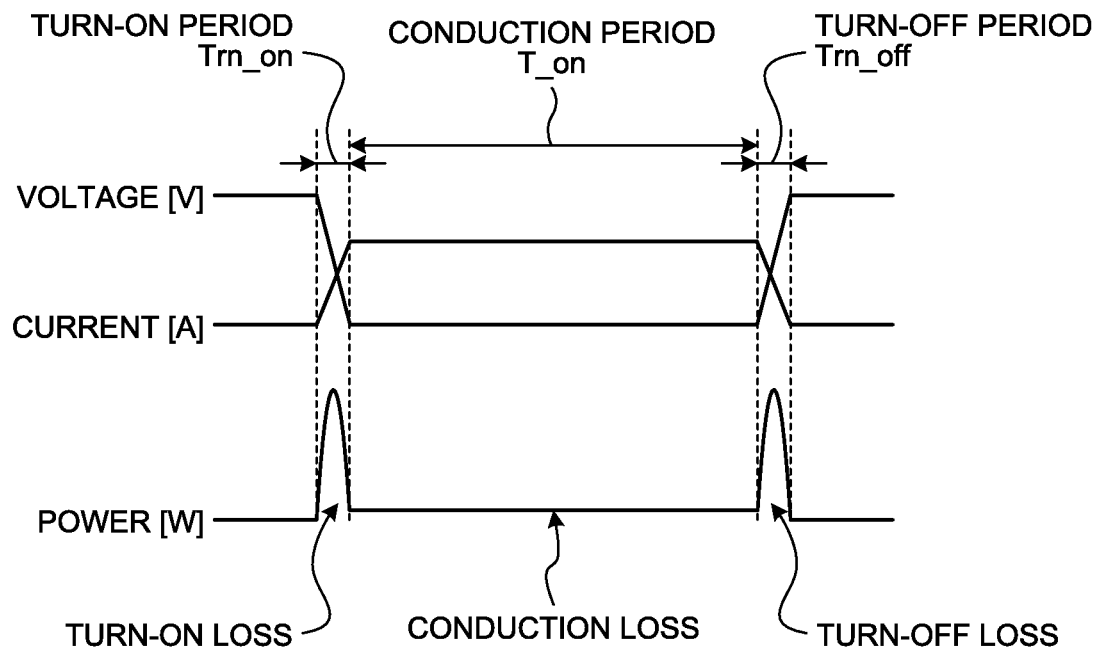
FIG. 22 is a third schematic diagram illustrating the relationship among the voltage applied to the switching element of the power converting apparatus according to the first embodiment, the current flowing through the switching element, and the loss occurring in the switching element.

FIG. 22 is a third schematic diagram illustrating the relationship among the voltage applied to the switching element of the power converting apparatus according to the first embodiment, the current flowing through the switching element, and the loss occurring in the switching element. FIG. 22 depicts a turn-on loss, a conduction loss, and a turn-off loss when the switching speed is higher than that in FIG. 20. In the power converting apparatus 100 according to the first embodiment, the loss characteristics of the switching elements 311 and 312 that occur in each switching event is better than the loss characteristics of the switching elements 321 and 322 that occur in each switching event. For example, the switching elements 311 and 312 are formed of semiconductors having switching characteristics providing a short turn-on period and a short turn-off period, as illustrated in FIG. 22. The switching elements 321 and 322 are formed of semiconductors having switching characteristics providing a long turn-on period and a long turn-off period, as illustrated in FIG. 21.

Control parameters used by the power supply current command value control unit 21 and the on-duty control unit 22 for the calculations have optimum values in accordance with a drive condition. The drive condition is represented by at least one value of the power supply voltage Vs, the power supply current Is, and the bus voltage Vdc. For example, it is desirable that the proportional control gain in the on-duty control unit 22 change in inverse proportion to the bus voltage Vdc. In contrast, if the control parameters are kept at constant values with respect to changes in the drive condition, the control parameters deviate significantly from values suitable for control. As a result, harmonics in the power supply current Is increase, and the pulsation of the bus voltage Vdc increases, which may lower the power factor of the power supply. In view of possible occurrence of such a problem, thus, the control parameters are adjusted on the basis of detection information, thereby providing the control parameters with values suitable for control, such that the controllability is improved. The detection information is, for example, at least one of the power supply voltage Vs, the power supply current Is, and the bus voltage Vdc, or information that enables the estimation thereof. The information that enables the estimation is, for example, power information that is detected by a detector that detects the power supplied from the alternating-current power supply 1. The power supply current command value control unit 21 and the on-duty control unit 22 may hold a calculation formula or a table for implementing desired circuit operation, and may adjust the control parameters on the basis of the detection information, using the calculation formula or the table.

In the above-described example, the calculation methods employed by the power supply current command value control unit 21 and the on-duty control unit 22 are proportional integral control. However, the present invention is not limited by these calculation methods, and another calculation method may be used. A derivative term may be added for proportional integral derivative control. The calculation methods employed by the power supply current command value control unit 21 and the on-duty control unit 22 need not be the same.

Referring back to FIG. 13, the second pulse generation unit 25 generates and outputs pulse_321A and pulse_322A on the basis of the power supply voltage Vs detected by the power supply voltage detecting unit 5 and the power supply current Is detected by the power supply current detecting unit 6. The pulse_321A is a drive signal for the switching element 321, and the pulse_322A is a drive signal for the switching element 322.

Figure 23:
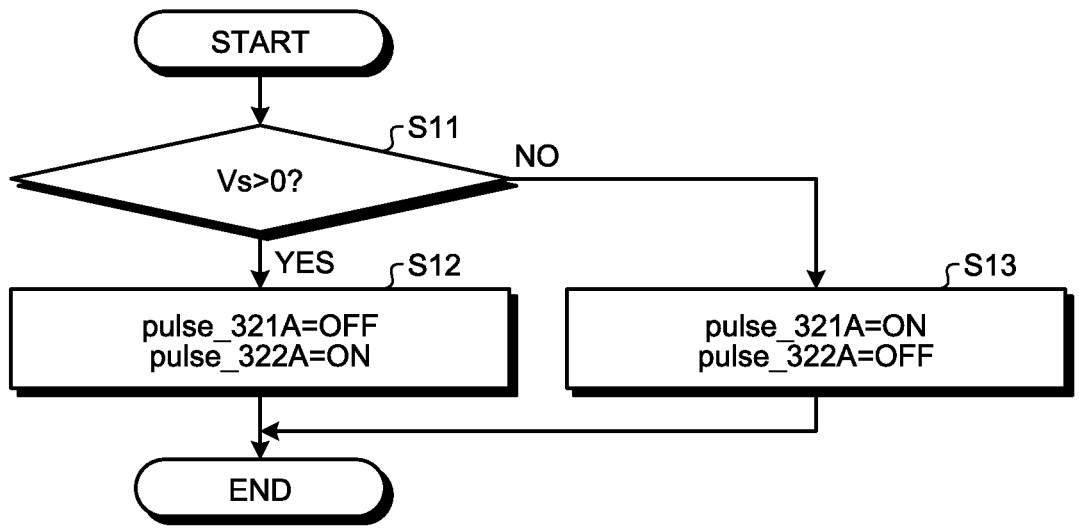
FIG. 23 is a flowchart illustrating an exemplary procedure in a second pulse generation unit illustrated in FIG. 13.

FIG. 23 is a flowchart illustrating an exemplary procedure in the second pulse generation unit illustrated in FIG. 13. The basic operation of the second pulse generation unit 25 is to control the ON/OFF state of the switching element 321 and the switching element 322 in accordance with the polarity of the power supply voltage Vs. As illustrated in FIG. 23, the second pulse generation unit 25 determines whether the polarity of the power supply voltage Vs is positive, that is, whether Vs>0 is satisfied (step S11). When the polarity of the power supply voltage Vs is positive (step S11: Yes), the second pulse generation unit 25 generates and outputs pulse_321A and pulse_322A to turn off the switching element 321 and turn on the switching element 322 (step S12).

When the polarity of the power supply voltage Vs is negative (step S11: No), the second pulse generation unit 25 generates and outputs pulse_321A and pulse_322A to turn on the switching element 321 and turn off the switching element 322 (step S13). This enables synchronous rectification control, so that a highly efficient system can be established as described above.

However, as described above, if the switching element 311 and the switching element 322 are turned on when the power supply current Is is not flowing, a capacitor short circuit through the alternating-current power supply 1 and the reactor 2 occurs. Therefore, the power converting apparatus 100 according to the first embodiment not only controls the switching element 311 and the switching element 322 but also controls the ON/OFF state of the switching element 321 and the switching element 322 on the basis of the power supply current Is.

Figure 24:
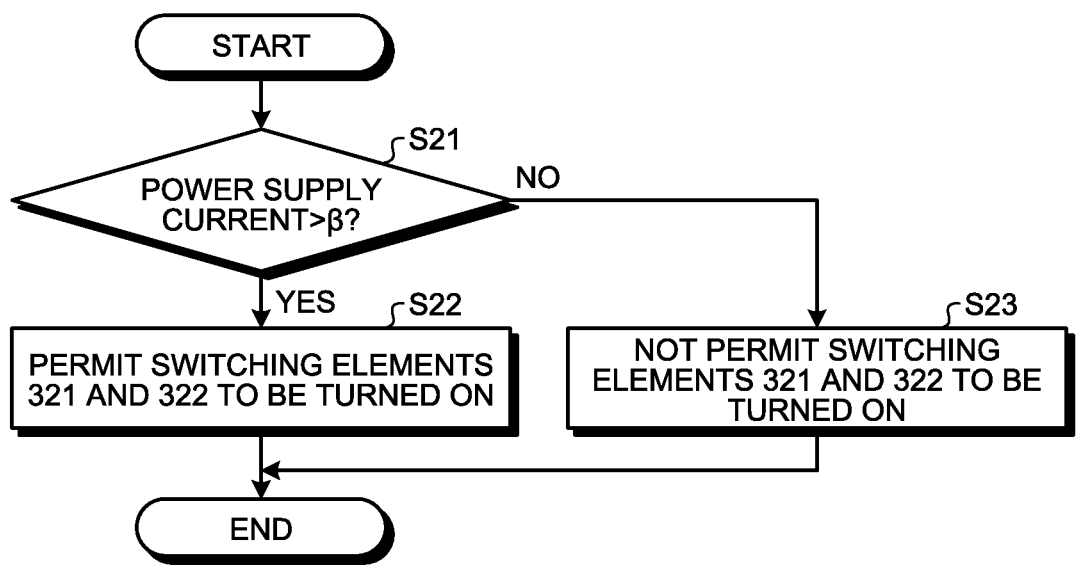
FIG. 24 is a flowchart illustrating an exemplary procedure for controlling switching elements by the second pulse generation unit illustrated in FIG. 13 based on the power supply current.

FIG. 24 is a flowchart illustrating an exemplary procedure for controlling switching elements by the second pulse generation unit illustrated in FIG. 13 on the basis of the power supply current. As illustrated in FIG. 24, it is determined whether the absolute value of the power supply current Is is larger than a current threshold β (step S21). When the absolute value of the power supply current Is is larger than the current threshold β (step S21: Yes), the second pulse generation unit 25 permits the switching element 321 and the switching element 322 to be turned on (step S22). When the switching element 321 and the switching element 322 are permitted to be turned on, their ON/OFF state is controlled in accordance with the polarity of the power supply voltage Vs illustrated in FIG. 23.

When the absolute value of the power supply current Is is equal to or less than the current threshold β (step S21: No), the second pulse generation unit 25 does not permit the switching element 321 and the switching element 322 to be turned on (step S23). When the switching element 321 and the switching element 322 are not permitted to be turned on, the switching element 321 and the switching element 322 are controlled such that the switching elements 321, 322 are in the off states regardless of the polarity of the power supply voltage Vs illustrated in FIG. 23.

Under the above control, when a current larger than the current threshold β flows in the forward direction with respect to the parasitic diode of a switching element, the switching element 321 and the switching element 322 are turned on. This makes it possible to prevent a capacitor short circuit through the alternating-current power supply 1 and the reactor 2. Instead of performing ON/OFF control in accordance with the polarity of the power supply voltage Vs, the second pulse generation unit 25 may use the polarity of the power supply current Is, that is, the direction of current flow, to control the switching element 321 and the switching element 322.

Instead of the process illustrated in FIG. 24, it may be determined whether to permit the switching element 321 and the switching element 322 to be turned on the basis of the state of switching control. When switching is not performed, no current flows through the switching elements. Therefore, the timing of such a state is predicted to make sure that the switching element 321 and the switching element 322 are not permitted to be turned on. In that case, passive full-wave rectification in which short-circuit paths are not used may fail to obtain the synchronous rectification effect, but the control can be simply constructed without depending on the detection of current or voltage.

Instead of the process illustrated in FIG. 24, it may be determined whether to permit the switching element 321 and the switching element 322 to be turned on the basis of the difference between the power supply voltage Vs and the bus voltage Vdc. Specifically, when (power supply voltage-bus voltage)>0 is satisfied, the switching element 321 and the switching element 322 are permitted to be turned on, and when (power supply voltage-bus voltage)≤0 is satisfied, the switching element 321 and the switching element 322 are not permitted to be turned on.

In the example described above, the second pulse generation unit 25 selects which of the switching element 321 and the switching element 322 is turned on the basis of the power supply voltage polarity, and controls the switching element 321 and the switching element 322 so as to prevent a capacitor short circuit on the basis of the power supply current Is. However, the present invention is not limited to this example. The first pulse generation unit 24 may determine, on the basis of the power supply current Is, whether the switching elements 311, 312, 321, and 322 are permitted to be turned on so as to prevent a capacitor short circuit while the second pulse generation unit 25 may perform switching on the switching element 321 and the switching element 322 in accordance with the power supply voltage polarity without performing control for preventing a capacitor short circuit.

Specifically, the first pulse generation unit 24 does not permit the switching element 311 to be turned on when the absolute value of the power supply current Is is equal to or less than the current threshold β with the power supply voltage Vs being positive. The first pulse generation unit 24 permits the switching element 311 to be turned on when the absolute value of the power supply current Is is larger than the current threshold β with the power supply voltage Vs being positive. The first pulse generation unit 24 does not permit the switching element 312 to be turned on when the absolute value of the power supply current Is is equal to or less than the current threshold β with the power supply voltage Vs being negative. The first pulse generation unit 24 permits the switching element 312 to be turned on when the absolute value of the power supply current Is is larger than the threshold β with the power supply voltage Vs being negative.

In the example described above, the method for generating the complementary PWM signals implements switching in each arm on a power supply cycle basis. However, the method for generating PWM signals is not limited to this example. Specifically, the control unit 10 may generate the drive signal pulse_312A for the switching element 312 when the power supply voltage Vs is positive, and generate the drive signal pulse_311A for the switching element 311 when the power supply voltage Vs is negative. In this case, the control unit 10 may generate PWM signals for driving the switching elements 311 and 312 on the basis of the relationship among the power supply current Is, the power supply voltage Vs, and the bus voltage Vdc. This enables the switching elements 311 and 312 to be turned off before the timing at which the power supply current Is becomes zero. In this case, even when the operation of the switching elements 321 and 322 is controlled on the basis of the power supply voltage polarity, a capacitor short circuit through the alternating-current power supply 1 and the reactor 2 can be prevented.

Figure 25:
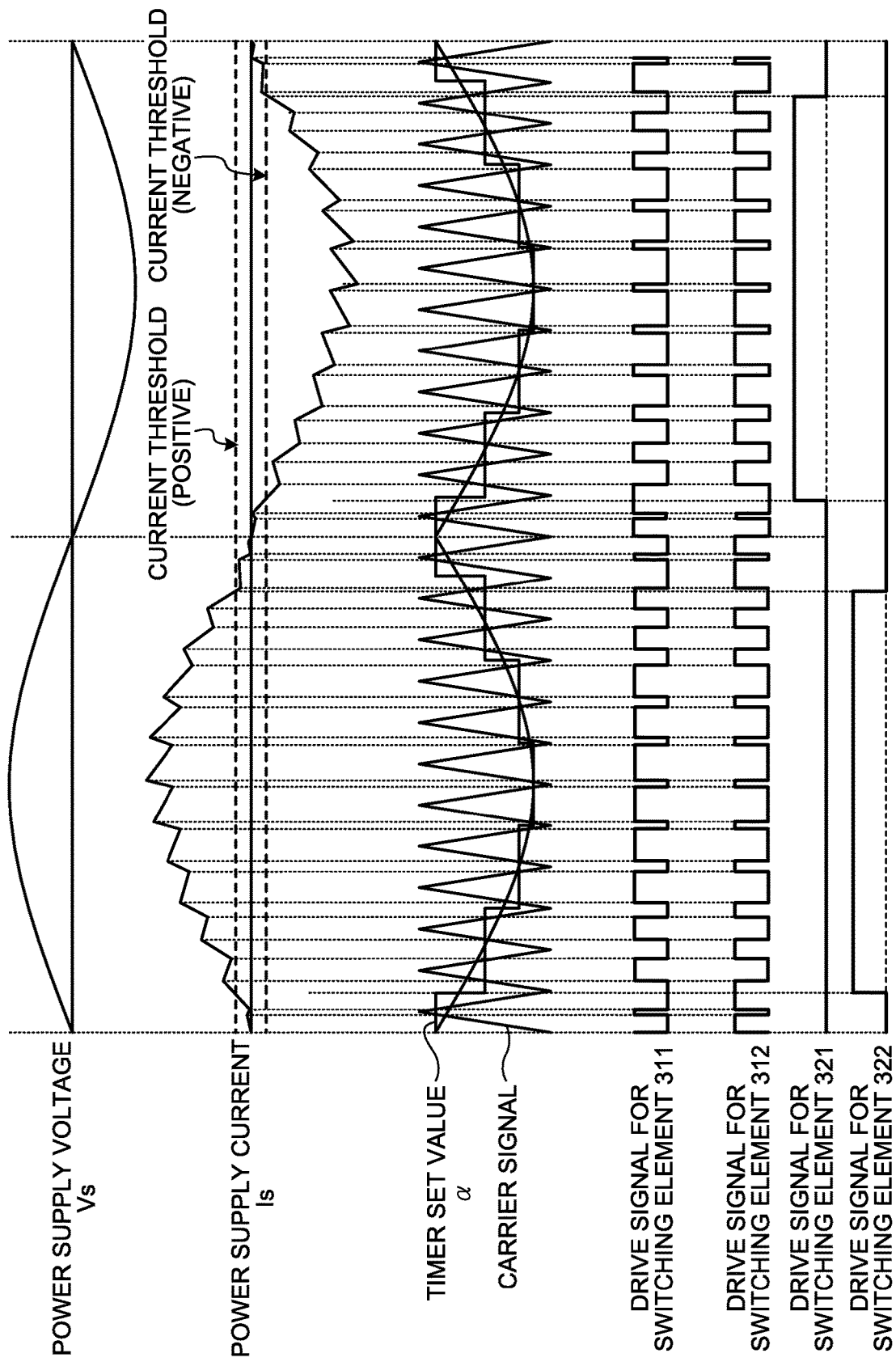
FIG. 25 is a diagram illustrating first examples of drive signals which are generated by the power converting apparatus according to the first embodiment for one cycle of the power supply voltage.

FIG. 25 is a diagram illustrating first examples of drive signals which are generated by the power converting apparatus according to the first embodiment for one cycle of the power supply voltage. FIG. 25 depicts examples of drive signals generated through the process described with reference to FIG. 23. In FIG. 25, the horizontal axis represents time. FIG. 25 illustrates the power supply voltage Vs, the power supply current Is, a timer set value α, a carrier signal, a drive signal for the switching element 311, a drive signal for the switching element 312, a drive signal for the switching element 321, and a drive signal for the switching element 322 in order from the top.

The timer set value α is a command value corresponding to the reference on-duty "duty", and changes stepwise as time goes by. The timer set value α has periods each providing a step having a constant value in the vertical axis. The reference on-duty "duty" corresponding to each stage of the timer set value α which changes stepwise in this manner is compared with the carrier wave "carry" which is a carrier signal, thereby determining the pulse widths of the switching elements 311 and 321. In the vicinity of a zero-cross of the power supply voltage Vs, the reference on-duty "duty" is small. As the power supply voltage Vs approaches its peak value, the reference on-duty "duty" increases. Note that the dead time is omitted in FIG. 25.

The current threshold (positive) on the positive side is set to suppress excessive switching operation in the vicinity of a zero-cross when the power supply current Is changes from negative to positive. Similarly, the current threshold (negative) on the negative side is set to suppress excessive switching operation in the vicinity of a zero-cross when the power supply current Is changes from positive to negative.

FIG. 25 depicts an operation example in which the switching elements 311 and 312 are subjected to complementary PWM control, the switching element 312 acting as a master when the power supply voltage Vs has positive polarity, the switching element 311 acting as a master when the power supply voltage Vs has negative polarity. For this reason, the downward convex arc-shaped reference on-duty "duty" is used when the power supply voltage Vs has positive polarity, and the downward convex arc-shaped reference on-duty "duty" is also used when the power supply voltage Vs has negative polarity.

The switching elements 321 and 322 are switched on or off in accordance with the polarity of the power supply voltage Vs, and are turned off when the absolute value of the power supply current Is is equal to or less than the current threshold. Note that the power supply current detecting unit 6 may be provided with a filter or hysteresis such that the power converting apparatus 100 according to the first embodiment suppresses excessive switching operation in the vicinity of the current threshold. Alternatively, the control unit 10 may include a filter or hysteresis for the power supply current Is such that the power converting apparatus 100 according to the first embodiment suppresses excessive switching operation in the vicinity of the current threshold.

Figure 26:
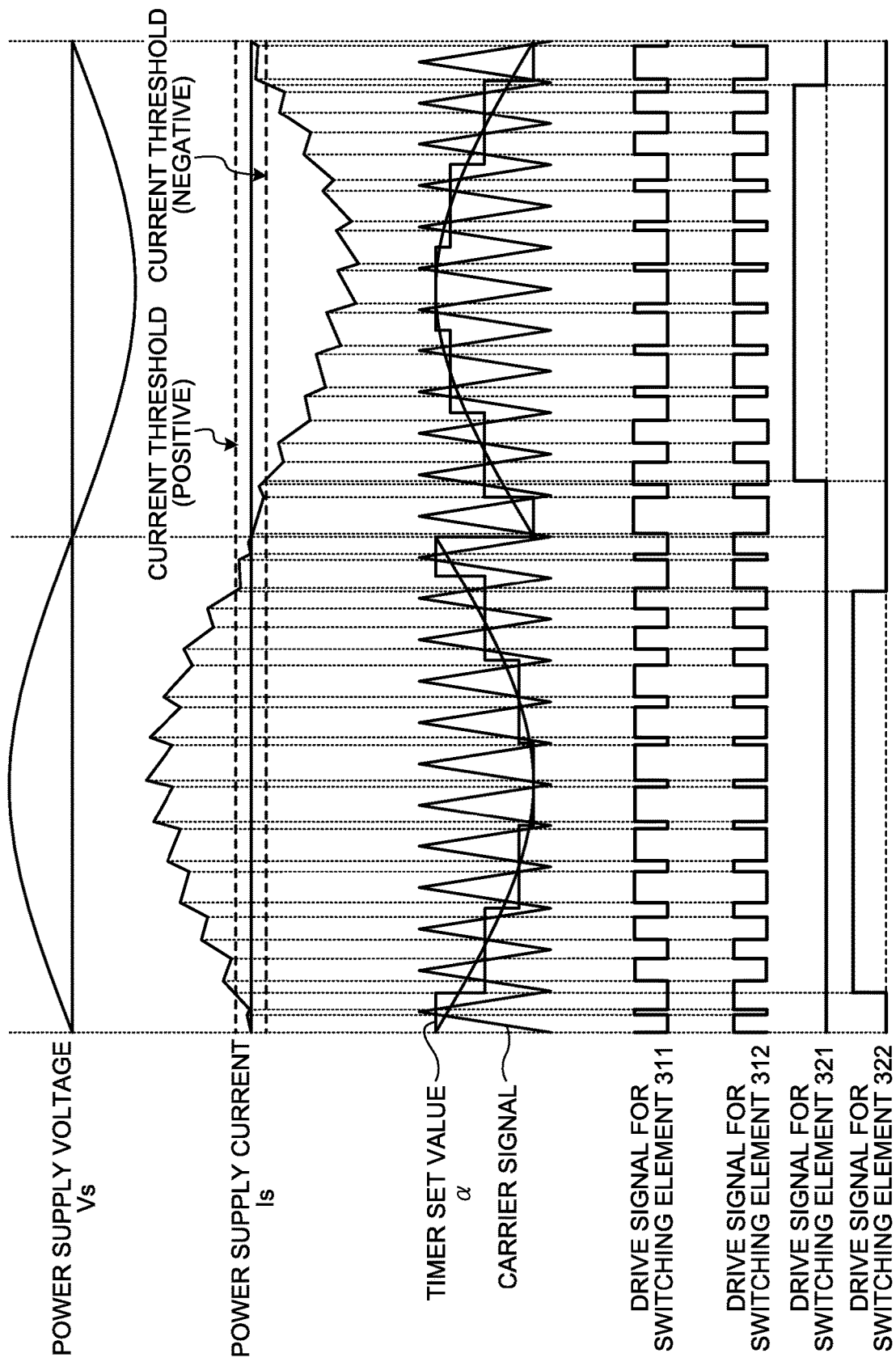
FIG. 26 is a diagram illustrating second examples of drive signals which are generated by the power converting apparatus according to the first embodiment for one cycle of the power supply voltage.

FIG. 26 is a diagram illustrating second examples of drive signals which are generated by the power converting apparatus according to the first embodiment for one cycle of the power supply voltage. In FIG. 26, as in FIG. 25, the horizontal axis represents time. FIG. 26 illustrates the power supply voltage Vs, the power supply current Is, the timer set value α, a carrier signal, a drive signal for the switching element 311, a drive signal for the switching element 312, a drive signal for the switching element 321, and a drive signal for the switching element 322 in order from the top.

FIG. 26 depicts an operation example in which the switching elements 311 and 312 are subjected to complementary PWM control, the switching element 312 acting as a master both when the power supply voltage Vs has positive polarity and when the power supply voltage Vs has negative polarity. For this reason, the downward convex arc-shaped reference on-duty "duty" is used when the power supply voltage Vs has positive polarity, and the upward convex arc-shaped reference on-duty "duty" is used when the power supply voltage Vs has negative polarity. In the operation example of FIG. 26, the drive signal pulse_312A for the switching element 312 is generated when the power supply voltage Vs has positive polarity, and the drive signal pulse_311A for the switching element 311 is generated when the power supply voltage Vs has negative polarity.

Figure 27:
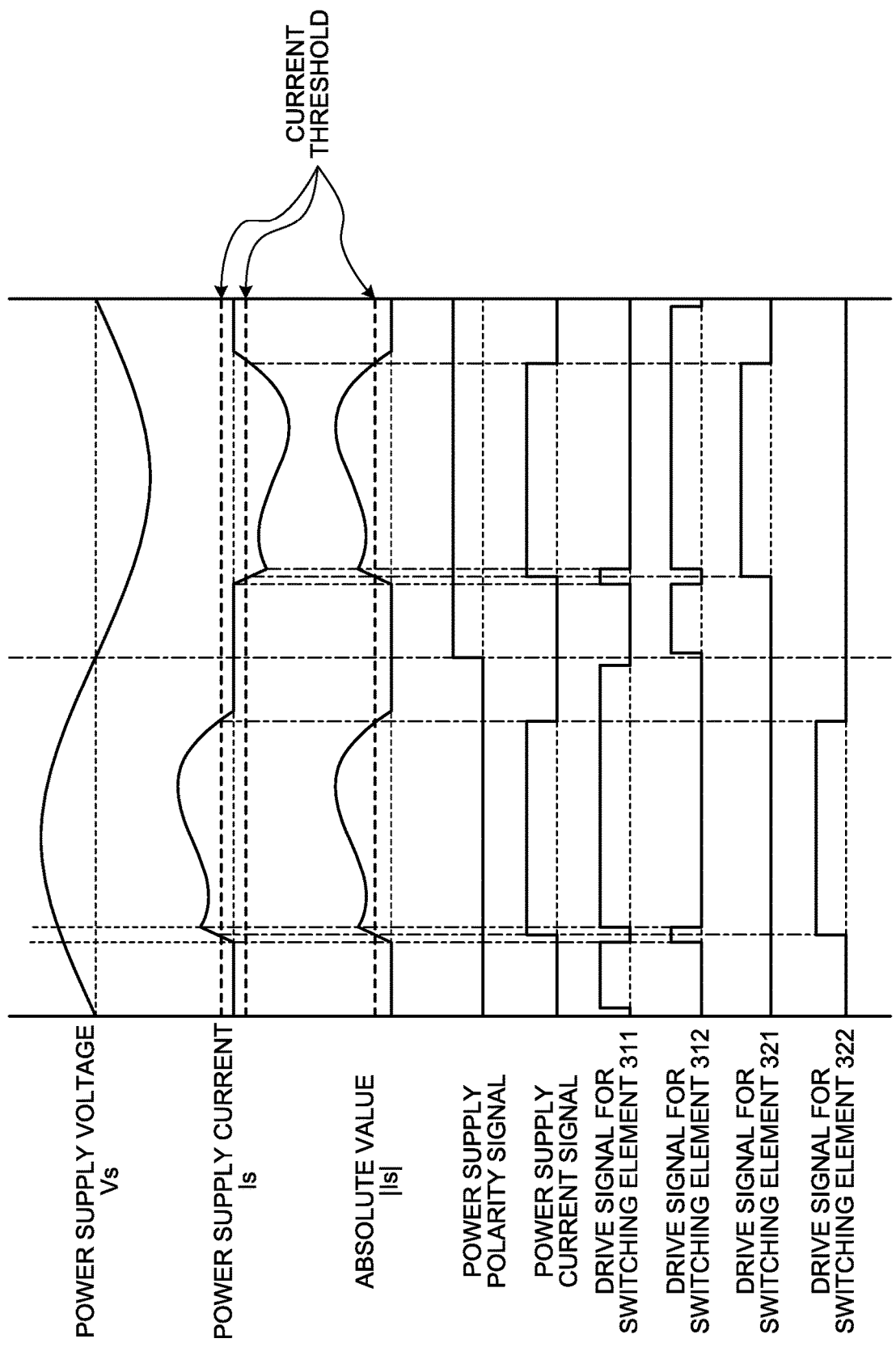
FIG. 27 is a diagram illustrating examples of drive signals for the case that the power converting apparatus according to the first embodiment performs simplified switching control.

Although FIG. 25 above depicts an example in which the switching elements are controlled using the carrier signal, the operation of the first embodiment is also applicable to simplified switching control under which one or several switching events occur during a half power supply cycle. FIG. 27 is a diagram illustrating examples of drive signals when the power converting apparatus according to the first embodiment performs simplified switching control. In FIG. 27, the horizontal axis represents time. FIG. 27 illustrates the power supply voltage Vs, the power supply current Is, the absolute value |Is| of the power supply current Is, a power supply polarity signal, a power supply current signal, a drive signal for the switching element 311, a drive signal for the switching element 312, a drive signal for the switching element 321, and a drive signal for the switching element 322 in order from the top. The power supply polarity signal is a binary signal that changes in accordance with the polarity of the power supply voltage Vs, and is used to control the switching element operation of the switching elements 311 and 312. The power supply current signal is a binary signal that is used to control the switching element operation of the switching elements 321 and 322.

FIG. 27 illustrates three current thresholds. The current threshold on the positive side of the power supply current Is is set for the same purpose as the current threshold (positive) on the positive side described with reference to FIG. 25. The current threshold on the negative side of the power supply current Is is set for the same purpose as the current threshold (negative) on the negative side described with reference to FIG. 25. The current threshold for the absolute value |Is| of the power supply current Is is set for changing the value of the power supply current signal.

The power supply polarity signal is generated by detection of a zero-cross of the power supply voltage Vs, and the power supply current signal is generated by detection of a zero-cross of the power supply current Is. In this case, when the absolute value |Is| of the power supply current Is is equal to or less than the current threshold, the power converting apparatus 100 performs control such that the switching element 311 and the switching element 321 are not simultaneously in the on states, and performs control such that the switching element 312 and the switching element 322 are not simultaneously in the on states. Consequently, a capacitor short circuit can be prevented.

Figure 28:
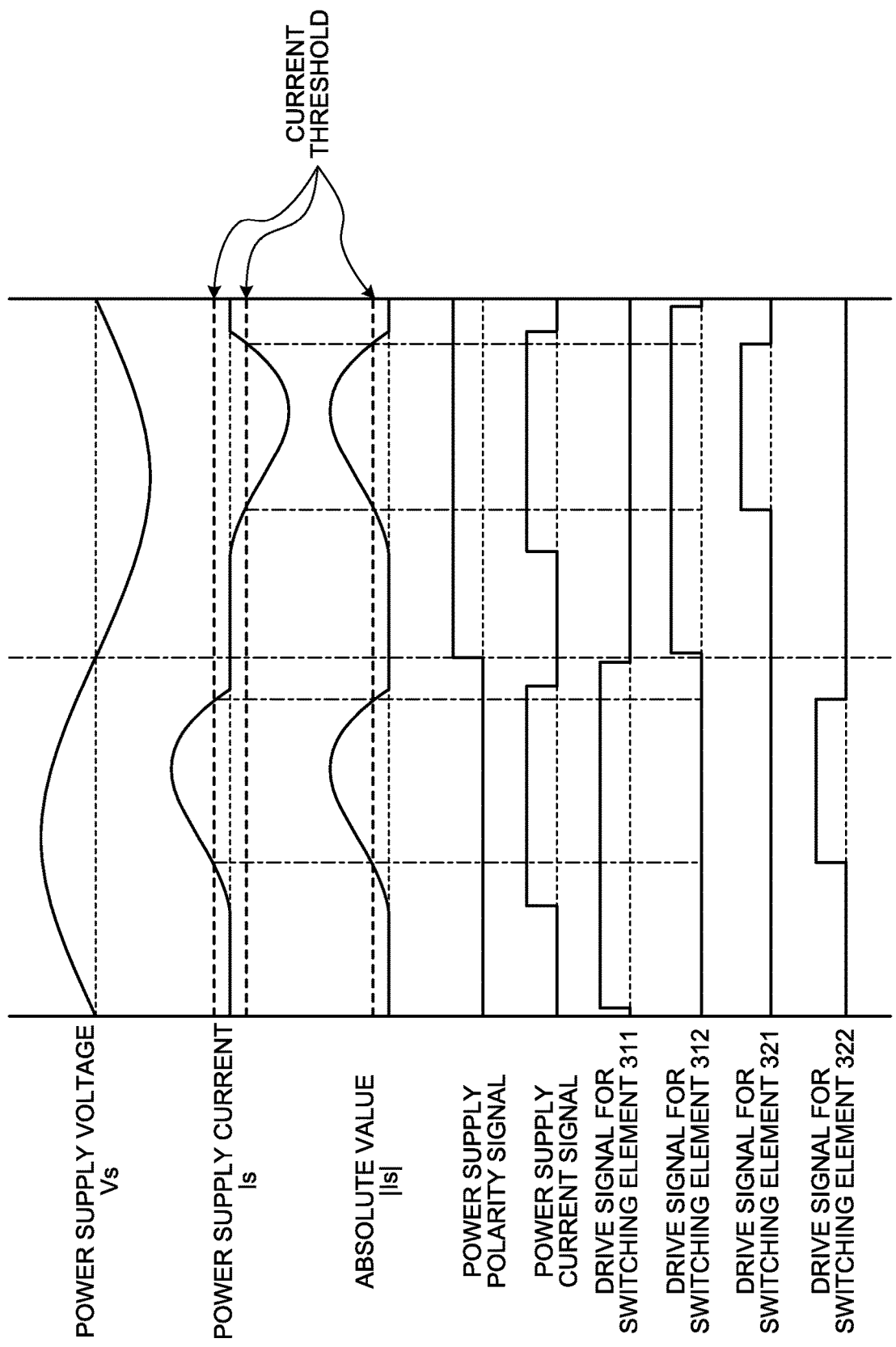
FIG. 28 is a diagram illustrating examples of passive-state drive signals which are generated by the power converting apparatus according to the first embodiment.

Even in a passive state where the switching elements 311 and 312 do not perform switching operation, when the absolute value of the power supply current Is is equal to or less than the current threshold, the switching elements 321 and 322 are not turned on, whereby a capacitor short circuit can be prevented. FIG. 28 is a diagram illustrating examples of passive-state drive signals which are generated by the power converting apparatus according to the first embodiment. In FIG. 28, as in FIG. 27, the horizontal axis represents time, and FIG. 28 illustrates the power supply voltage Vs, the power supply current Is, the absolute value |Is| of the power supply current Is, a power supply polarity signal, a power supply current signal, a drive signal for the switching element 311, a drive signal for the switching element 312, a drive signal for the switching element 321, and a drive signal for the switching element 322 in order from the top. In the same manner as the above, when the absolute value |Is| of the power supply current Is is equal to or less than the current threshold, the power converting apparatus 100 performs control such that the switching element 311 and the switching element 321 are not simultaneously in the on states, and performs control such that the switching element 312 and the switching element 322 are not simultaneously in the on states. Consequently, a capacitor short circuit can be prevented.

In the example of the first embodiment, synchronous rectification control is performed by detection of the power supply current Is. However, the power converting apparatus 100 according to the first embodiment may be configured to perform synchronous rectification control by detecting the current flowing through the bus between the bridge circuit 3 and the smoothing capacitor 4, instead of detecting the power supply current Is. In this case, since currents in the short-circuit paths cannot be detected, synchronous rectification control using the current threshold may shorten the period in which synchronous rectification operation can be performed. For this reason, in the case of performing synchronous rectification control by detecting the bus current, the switching element 321 or the switching element 322 may be controlled so as to be turned on in accordance with the polarity at the time of the above-described short-circuit current operation even when the absolute value of the power supply current Is is less than the threshold. In that case, synchronous rectification operation can be performed over a wide period, so that the conduction loss in the switching element 321 or the switching element 322 can be reduced.

Here, the switching frequencies of the switching elements 311 and 312 that perform PWM switching operation are higher than the switching frequencies of the switching elements 321 and 322 that perform switching operation in accordance with the polarity of the power supply voltage Vs. For this reason, switching losses occur more frequently in the switching elements 311 and 312 than in the switching elements 321 and 322. The power converting apparatus 100 according to the first embodiment includes the switching elements 311 and 312 characterized by producing smaller losses than the switching elements 321 and 322 in each switching event. That is, the loss characteristics of the first switching element and the second switching element that occur in each switching event is better than the loss characteristics of the third switching element and the fourth switching element that occur in each switching event. Therefore, the loss in the switching elements 311 and 312 that occurs in each switching event is smaller than the loss in the switching elements 321 and 322 that occurs in each switching event. For this reason, the loss per switching event of the switching elements 311 and 312 is small as compared with the case where the switching characteristics of the switching elements 311 and 312 are equal to the switching characteristics of the switching elements 321 and 322. As a result, the generation of excessive heat in the switching elements 311 and 312 during PWM switching operation is prevented. Consequently, the unevenness of heat generation between the first arm 31 and the second arm 32 is reduced, and the rise of the junction temperature of the semiconductors that form the switching elements 311 and 312 is suppressed. Furthermore, since the rise of the junction temperature is suppressed, the switching elements 311 and 312 can be driven at high speed, and the power converting apparatus 100 can achieve a high output.

Note that the first arm 31 is desirably mounted on what is called a 2-in-1 module in which the switching elements 311 and 312 are provided in one package. Similarly, the second arm 32 is desirably mounted on a 2-in-1 module in which the switching elements 321 and 322 are provided in one package. In a typical 2-in-1 module, two switching elements having the same switching characteristics are mounted. In the case where each of the first arm 31 and the second arm 32 is mounted on a 2-in-1 module, the unevenness of heat generation between the switching element 311 and the switching element 312 is reduced significantly and the unevenness of heat generation between the switching element 321 and the switching element 322 is reduced significantly, as compared with the case where each of the switching elements 311, 312, 321, and 322 is configured as one module.

One of the methods for increasing the switching speed is to reduce the gate resistances of the switching elements 311, 312, 321, and 322. As the gate resistance becomes smaller, the charge/discharge time for the gate input capacitance decreases, and the turn-on period and the turn-off period becomes shorter, thus increasing the switching speed. In the power converting apparatus 100 according to the first embodiment, therefore, it is desirable to make the gate resistances of the switching elements 311 and 312 smaller than the gate resistances of the switching elements 321 and 322.

However, there is a limit to reducing the switching loss by reducing the gate resistance. Thus, the switching elements 311, 312, 321, and 322 are formed of WBG semiconductors such as GaN or SiC, so that the loss per switching event can be further reduced, the efficiency can be further improved, and high frequency switching can be performed. Since high frequency switching can be performed, the reactor 2 can be reduced in size, and the power converting apparatus 100 can be reduced in size and weight. The use of WBG semiconductors as the switching elements improves the switching speed and reduces the switching loss, so that heat dissipation measures that enable the switching elements to continue their normal operation can be simplified. The use of WBG semiconductors as the switching elements also contributes to setting the switching frequency to a sufficiently high value, e.g. 16 kHz or more, so that noise due to switching can be suppressed.

A GaN semiconductor produces a two-dimensional electron gas at the interface between the GaN layer and the aluminum gallium nitride layer, and has high mobility of carriers due to the two-dimensional electron gas. For this reason, switching elements including GaN semiconductors enable high speed switching. In a case where the alternating-current power supply 1 is a commercial power supply of 50 Hz/60 Hz, audible frequencies range from 16 kHz to 20 kHz, that is, from 266 times to 400 times the frequency of the commercial power supply. GaN semiconductors are suitable for switching at frequencies higher than the audible frequencies. In a case where the switching elements 311, 312, 321, and 322 are formed of silicon (Si), which is the major material of semiconductors, and driven at switching frequencies of several tens of kHz or more, the ratio of the switching loss is large, and measures for heat dissipation are essential. On the other hand, the switching elements 311, 312, 321, and 322 formed of GaN semiconductors have a very small switching loss even when driven at switching frequencies of several tens of kHz or more, specifically at switching frequencies higher than 20 kHz. As a result, measures for heat dissipation are unnecessary, or the size of a heat dissipation member that is used for heat dissipation measures can be reduced, so that the power converting apparatus 100 can be reduced in size and weight. Moreover, since high frequency switching can be performed, the reactor 2 can be reduced in size. In order that the primary component of the switching frequency does not fall within the measurement range of the noise terminal voltage standard, the switching frequency is preferably 150 kHz or less.

Since WBG semiconductors have a smaller electrostatic capacitance than Si semiconductors, the amount of recovery current generation due to switching is small, and the generation of loss and noise due to recovery current can be reduced. Therefore, WBG semiconductors are suitable for high frequency switching.

Since SiC semiconductors have a smaller ON resistance than GaN semiconductors, the switching elements 311 and 312 of the first arm 31, in which switching events occur more frequently than in the second arm 32, may be formed of GaN semiconductors, and the switching elements 321 and 322 of the second arm 32, in which switching events occur less frequently, may be formed of SiC semiconductors. Consequently, the respective characteristics of SiC semiconductors and GaN semiconductors can be fully utilized. The use of SiC semiconductors for the switching elements 321 and 322 of the second arm 32, in which switching events occur less frequently than in the first arm 31, increases the ratio of the conduction loss among the losses in the switching elements 321 and 322, and reduces the turn-on loss and the turn-off loss. Therefore, the generation of excessive heat involved in the switching of the switching elements 321 and 322 is prevented, the chip area of the switching elements 321 and 322 making up the second arm 32 can be relatively reduced, and SiC semiconductors whose yield in chip manufacture is low can be effectively used.

Alternatively, super junction (SJ)-MOSFETs may be used for the switching elements 321 and 322 of the second arm 32, in which switching events occur less frequently. The use of SJ-MOSFETs can suppress the disadvantage that the electrostatic capacitance is high and recovery is apt to occur while making use of the SJ-MOSFETs' advantage that the ON resistance is low. The use of SJ-MOSFETs can also reduce the manufacturing cost of the second arm 32 significantly, as compared with the case of using WBG semiconductors.

WBG semiconductors have higher heat resistance properties than Si semiconductors, and can operate even at high junction temperatures. Thus, the use of WBG semiconductors makes it possible to configure the first arm 31 and the second arm 32 by using small chips having a large thermal resistance. In particular, SiC semiconductors whose yield in chip manufacture is low can contribute to cost reduction when used for small chips.

WBG semiconductors prevent an increase in switching element loss even when WBG semiconductors are driven at a high frequency of about 100 kHz. WBG semiconductors can thus increase the loss reduction effect produced by the reduction in the size of the reactor 2, and contribute to producing a converter that operates efficiently in a wide output band, that is, under a wide range of load conditions.

WBG semiconductors have higher heat resistance properties than Si semiconductors and have high tolerable levels of switching heat generation due to the unevenness of loss between arms. Thus, WBG semiconductors are suitable for the first arm 31 which produces switching losses due to high frequency driving.

Note that the power converting apparatus 100 according to the first embodiment may be made of a general-purpose intelligent power module (IPM). The use of an IPM enables the drive circuit of the switching elements 311, 312, 321, and 322 to be incorporated into the IPM, which can reduce the substrate area for mounting the reactor 2, the bridge circuit 3, the smoothing capacitor 4, the power supply voltage detecting unit 5, the power supply current detecting unit 6, the bus voltage detecting unit 7, and the control unit 10. The use of a general-purpose IPM can prevent an increase in cost.

Although the power supply voltage Vs is detected in the power converting apparatus 100 according to the first embodiment, the power converting apparatus 100 may be configured to determine the polarity of the power supply voltage Vs by detecting a zero-cross point of the power supply voltage Vs. If the polarity of the power supply voltage Vs can be identified, the first arm 31 and the second arm 32 can be operated. In this case, in order to prevent a false polarity determination in the vicinity of a zero-cross, the power converting apparatus 100 stops the operation of the first arm 31 and the second arm 32 for a certain period of time from the zero-cross time point on the basis of the power supply voltage phase estimated value $\hat{\theta}s$.

Although the power converting apparatus 100 according to the first embodiment permits the switching element 321 and the switching element 322 to be turned on when the absolute value of the power supply current Is is equal to or larger than the current threshold, the configuration of the power converting apparatus 100 is not limited to this. The power converting apparatus 100 may control the switching element 321 and the switching element 322 by estimating that current flows through the parasitic diode of a switching element, using any of the power supply voltage Vs, the voltage applied to the first arm 31, the bus voltage Vdc, and the voltage applied to the two ends of the switching element. In the case of estimating that current flows through the parasitic diode of a switching element using any of the power supply voltage Vs, the voltage applied to the first arm 31, and the bus voltage Vdc, estimation errors should be taken into consideration because many factors cause variations in determination. In the case of estimating that current flows through the parasitic diode of a switching element, using the voltage applied to the two ends of the switching element, a voltage detection circuit is required for each switching element that undergoes current flow estimation.

Figure 29:
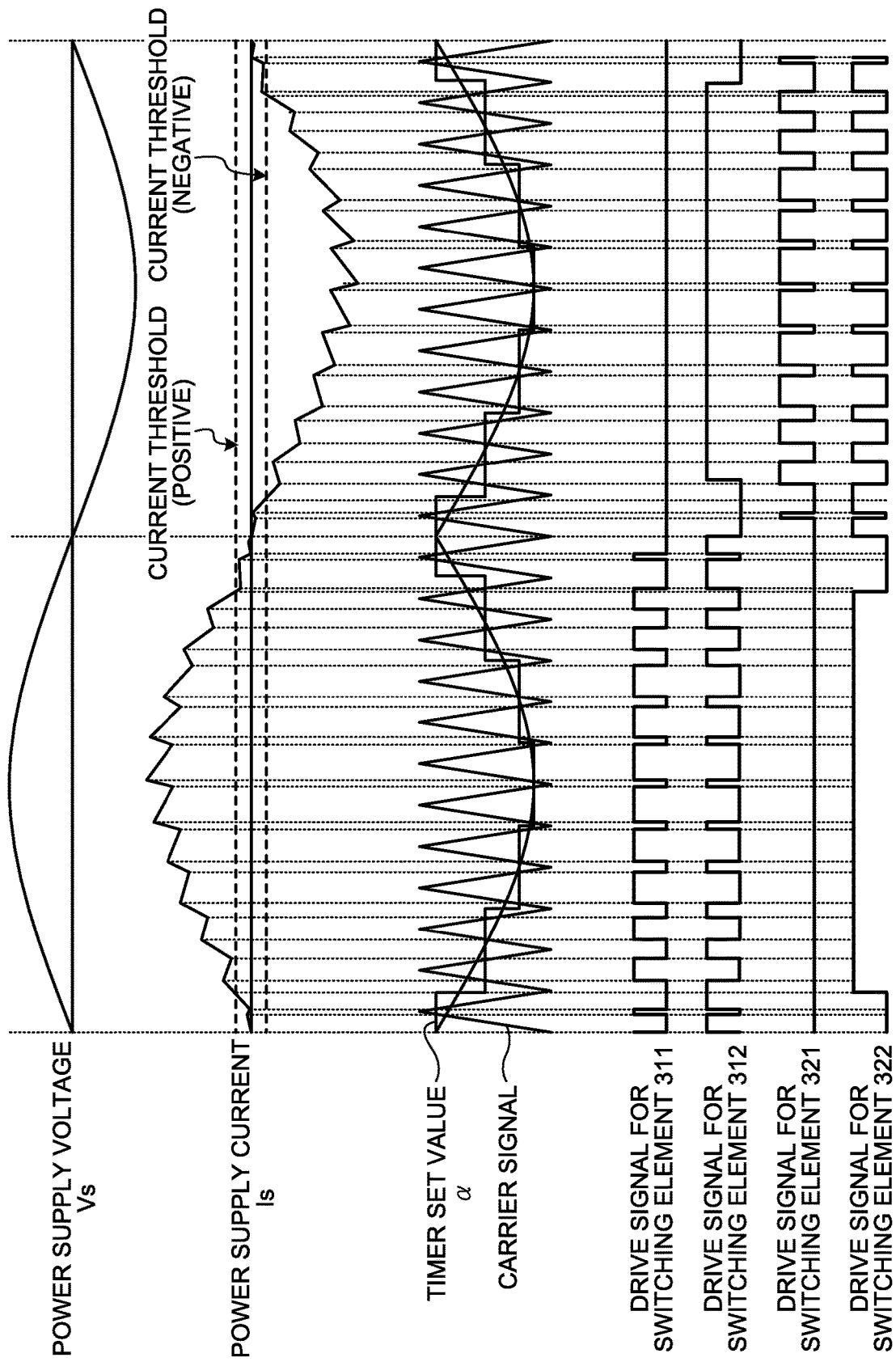
FIG. 29 is a diagram illustrating third examples of drive signals which are generated by the power converting apparatus according to the first embodiment for one cycle of the power supply voltage.

FIG. 29 is a diagram illustrating third examples of drive signals which are generated by the power converting apparatus according to the first embodiment for one cycle of the power supply voltage. In FIG. 29, the horizontal axis represents time. FIG. 29 illustrates the power supply voltage Vs, the power supply current Is, the timer set value α, a carrier signal, a drive signal for the switching element 311, a drive signal for the switching element 312, a drive signal for the switching element 321, and a drive signal for the switching element 322 in order from the top.

In the example of FIG. 29, the switching element 312 is switched at high speed for current control when the polarity of the power supply voltage Vs is positive, and the switching element 322 is switched at high speed for current control when the polarity of the power supply voltage Vs is negative. In the example of FIG. 29, the loss in the switching elements 312 and 322 that occurs in each switching event is smaller than the loss in the switching elements 311 and 321 that occurs in each switching event. By making the switching characteristics of the lower switching elements different from the switching characteristics of the upper switching elements in this manner, it is possible to reduce the switching loss. However, in this exemplary configuration, it is necessary to switch each of the switching elements 311, 312, 321, and 322 at high speed because it is required that the upper switching elements be switched complementarily to the lower switching elements for synchronous rectification. That is, the switching elements 311 and 312 perform high speed switching when the power supply voltage Vs has positive polarity, and the switching elements 321 and 322 perform high speed switching when the power supply voltage Vs has negative polarity. It is also necessary to improve the recovery characteristics of all the switching elements 311, 312, 321, and 322 in order to reduce the recovery loss due to switching, and hence the exemplary configuration illustrated in FIG. 29 is not suitable for the power converting apparatus 100 according to the first embodiment.

As described above, in the power converting apparatus 100 according to the first embodiment, the loss that occurs in each switching event of the switching elements 311 and 312 that control the power supply current is smaller than the loss that occurs in each switching event of the switching elements 321 and 322 that perform switching in accordance with the power supply voltage polarity. Therefore, the unevenness of heat generation between the arms can be reduced, and the power converting apparatus 100 can achieve a high output.

Second Embodiment

Figure 30:
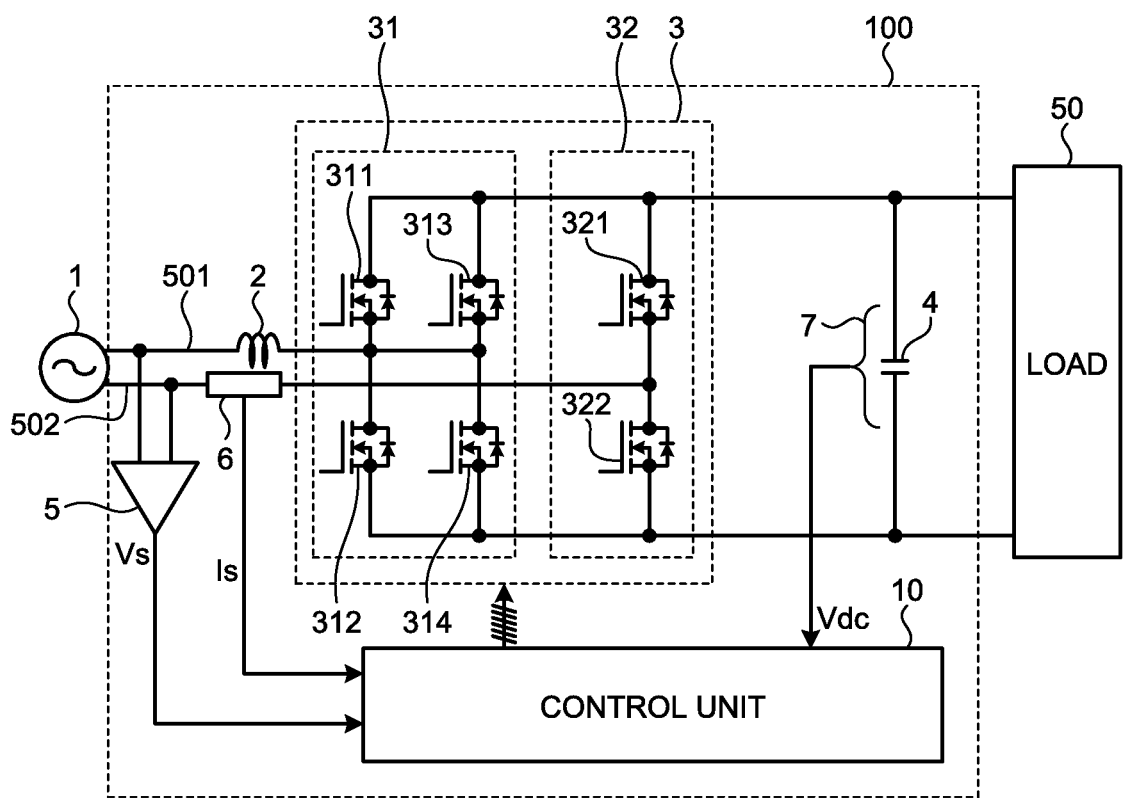
FIG. 30 is a diagram illustrating an exemplary configuration of a power converting apparatus according to a second embodiment.

In the exemplary configuration described in the first embodiment, synchronization control is performed using one switching element pair. However, synchronization control may be performed using n switching element pairs connected in parallel. Note that n is an integer of two or more. FIG. 30 is a diagram illustrating an exemplary configuration of a power converting apparatus according to the second embodiment. In the power converting apparatus 100 according to the second embodiment, the first arm 31 includes a switching element 313 which is a fifth switching element and a switching element 314 which is a sixth switching element. The switching element 313 and the switching element 314 are connected in series. The switching element pair made up of the switching element 313 and the switching element 314 is connected in parallel with the switching element pair made up of the switching element 311 and the switching element 312. The reactor 2 is connected to the connection point of the switching element 313 and the switching element 314. FIG. 30 depicts an exemplary configuration in which synchronous control is performed using two arms.

For driving the first arm 31 including two switching element pairs connected in parallel, the two switching elements 311 and 313 making up the upper arm of the two switching element pairs are simultaneously driven, and the two switching elements 312 and 314 making up the lower arm are simultaneously driven. Note that simultaneously driving two switching elements connected in parallel is referred to as "parallel-driving".

As the two switching element pairs connected in parallel are parallel-driven, the current flowing through two switching elements is half the current flowing through the two switching elements of one switching element pair. As is apparent from the characteristics of FIG. 19, the loss in a switching element decreases as the current decreases. Therefore, the loss that occurs in the first arm 31 is reduced. Thus, the unevenness of heat generation between the first arm 31 and the second arm 32 can be further reduced.

Although FIG. 30 illustrates a configuration in which two switching element pairs are connected in parallel, the number of switching element pairs is not limited to two, and n switching element pairs may be connected in parallel. In the case of using n switching element pairs, the current flowing through one switching element pair is 1/n, so that the loss in the first arm 31 can be further reduced. It is not necessary to completely eliminate the unevenness of loss between the n switching element pairs connected in parallel, and the number of switching element pairs connected in parallel can be selected in the allowable range of loss unevenness.

Figure 31:
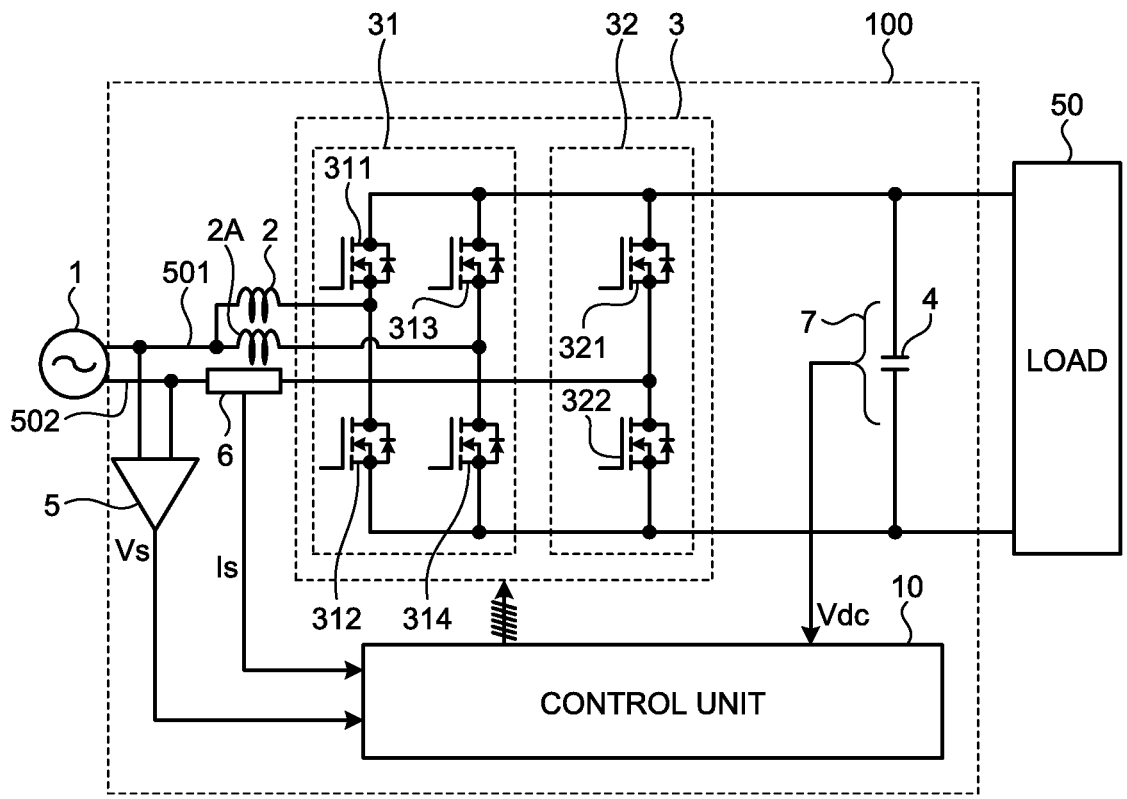
FIG. 31 is a diagram illustrating another exemplary configuration of a power converting apparatus according to the second embodiment.

In the example depicted in FIG. 30, two switching elements connected in parallel in the first arm 31 are simultaneously driven. However, two switching elements connected in parallel may be controlled with a phase shift of 180°, that is, what is called interleave control may be performed. FIG. 31 is a diagram illustrating another exemplary configuration of a power converting apparatus according to the second embodiment. In FIG. 31, the reactor 2 that is a first reactor and a reactor 2A that is a second reactor are provided between the alternating-current power supply 1 and the first arm 31. The reactor 2 has one end connected to one output end of the alternating-current power supply 1 and an opposite end connected to the connection point of the switching element 311 and the switching element 312. The reactor 2A has its one end connected to the one output end of the alternating-current power supply 1 and an opposite end connected to the connection point of the switching element 313 and the switching element 314.

The control unit 10 of the power converting apparatus 100 configured as illustrated in FIG. 31 performs interleave driving by controlling the switching element 311 and the switching element 313 connected in parallel such that a phase is shifted by 180° in turning on the switching element 311 and the switching element 313. The control unit 10 also performs the interleave driving by controlling the switching element 312 and the switching element 314 connected in parallel such that a phase is shifted by 180° in turning on the switching element 312 and the switching element 314. The interleave driving of the first arm 31 facilitates high frequency operation, which can reduce the size of the reactor 2 and the reactor loss. If the reactor 2 is often used in a passive state like in an air conditioner, it is unnecessary to reduce the size of the reactor 2, and the configuration and operation of the first embodiment is more effective in terms of harmonic suppression and the power factor of the power supply.

In a case where the first arm 31 is made up of a plurality of switching element pairs connected in parallel, each of the plurality of switching elements making up the first arm 31 may be implemented by one chip formed of a SiC semiconductor. Instead of a chip formed of a SiC semiconductor, each of the plurality of switching elements making up the first arm 31 may be configured using a WBG semiconductor such as GaN, SiC, diamond, or aluminum nitride. In a case where the first arm 31 is made up of one switching element pair, two switching elements making up the one switching element pair are implemented using two chips formed of WBG semiconductors. On the other hand, in a case where the first arm 31 is made up of a plurality of switching element pairs connected in parallel, if, for example, two switching element pairs are in parallel, four switching elements making up the two switching element pairs are implemented using four chips formed of WBG semiconductors. Thus, the first arm 31 made up of a plurality of switching element pairs connected in parallel can have a smaller area per chip than the first arm 31 made up of one switching element pair. That is, a first chip area can be smaller than a second chip area. The first chip area is the area of one of first chips each of which is formed of a WBG semiconductor and equipped with one of a plurality of switching elements of the first arm 31 constituted by a plurality of switching element pairs connected in parallel. The second chip area is the area of one of second chips each of which is formed of a WBG semiconductor and equipped with one of a plurality of switching elements of the first arm 31 constituted by one switching element pair. Since the yield of WBG semiconductor chips in chip manufacture is low, the reduction in chip area can contribute to cost reduction. Since the first arm 31 made up of a plurality of switching element pairs connected in parallel has a small chip area, thus, the yield in chip manufacture relating to, for example, SiC single crystal defects is improved, and the manufacturing cost of the first arm 31 can be reduced. Since low current capacity elements are used for many switching elements, the production of low current capacity switching elements is greater than that of high current capacity switching elements. Since low current capacity switching elements can be used for the first arm 31 made up of a plurality of switching element pairs connected in parallel, thus, the manufacturing cost of the first arm 31 can be further reduced.

Figure 32:
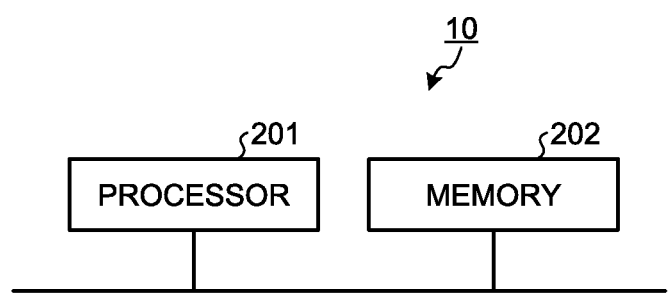
FIG. 32 is a diagram illustrating an example of a hardware configuration for implementing the control unit of the first and second embodiments.

Here, the hardware configuration of the control unit 10 of the power converting apparatus 100 according to the first and second embodiments will be described. FIG. 32 is a diagram illustrating an example of a hardware configuration for implementing the control unit of the first and second embodiments. The control unit 10 described in the first and second embodiments is implemented by a processor 201 and a memory 202.

The processor 201 is a CPU (also referred to as a central processing unit, a central processing device, a processing device, a computation device, a microprocessor, a microcomputer, a processor, or a digital signal processor (DSP)), or a system large scale integration (LSI). The memory 202 is, for example, a volatile or non-volatile semiconductor memory such as a random access memory (RAM), a read only memory (ROM), a flash memory, an erasable programmable read only memory (EPROM), or an electrically erasable programmable read only memory (EEPROM). Alternatively, the memory 202 may be a magnetic disk, an optical disk, a compact disk, a mini disk, or a digital versatile disc (DVD).

The power supply current command value control unit 21, the on-duty control unit 22, the power supply voltage phase calculation unit 23, the first pulse generation unit 24, the second pulse generation unit 25, the current command value calculation unit 26, and the instantaneous value command value calculation unit 27 illustrated in FIG. 13 are implemented by the processor 201 and the memory 202 illustrated in FIG. 32. That is, the memory 202 stores a program that causes the processor 201 to operate as each of the power supply current command value control unit 21, the on-duty control unit 22, the power supply voltage phase calculation unit 23, the first pulse generation unit 24, the second pulse generation unit 25, the current command value calculation unit 26, and the instantaneous value command value calculation unit 27. The processor 201 reads and executes the program stored in the memory 202, whereby each of the above-described units is implemented.

Third Embodiment

Figure 33:
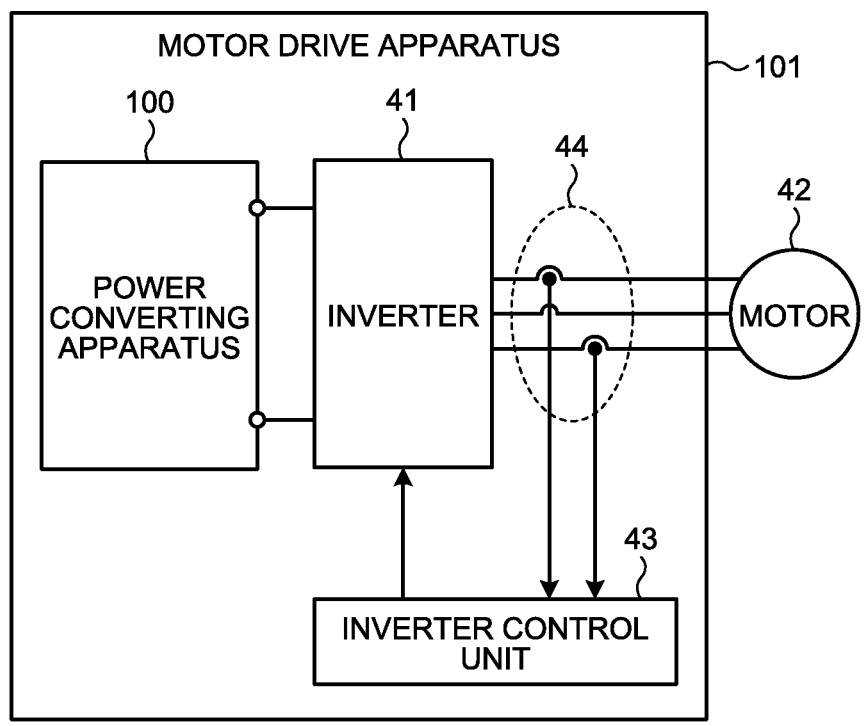
FIG. 33 is a diagram illustrating an exemplary configuration of a motor drive apparatus according to a third embodiment.

FIG. 33 is a diagram illustrating an exemplary configuration of a motor drive apparatus according to the third embodiment. The motor drive apparatus 101 according to the third embodiment drives a motor 42 which is a load. The motor drive apparatus 101 includes the power converting apparatus 100 according to the first or second embodiment, an inverter 41, a motor current detecting unit 44, and an inverter control unit 43. The inverter 41 drives the motor 42 by converting direct-current power supplied from the power converting apparatus 100, into alternating-current power and outputting the alternating-current power to the motor 42. In example described in the third embodiment, the load for the motor drive apparatus 101 is the motor 42. However, instead of the motor 42, any device to which alternating-current power is input may be connected to the inverter 41.

The inverter 41 is a circuit in which switching elements such as insulated gate bipolar transistors (IGBTs) have a three-phase bridge configuration or a two-phase bridge configuration. Instead of IGBTs, switching elements formed of WBG semiconductors, insulated gate controlled thyristors (IGCTs), field-effect transistors (FETs), or MOSFETs may be used as the switching elements of the inverter 41.

The motor current detecting unit 44 detects the current flowing between the inverter 41 and the motor 42. The inverter control unit 43 uses the current detected by the motor current detecting unit 44 to generate PWM signals for driving the switching elements in the inverter 41 and apply the PWM signals to the inverter 41 so that the motor 42 rotates at a rotational speed. In the same manner as the control unit 10, the inverter control unit 43 is implemented by a processor and a memory. Note that the inverter control unit 43 of the motor drive apparatus 101 and the control unit 10 of the power converting apparatus 100 may be implemented by one circuit.

In a case where the power converting apparatus 100 according to the first or second embodiment is used for the motor drive apparatus 101, the bus voltage Vdc necessary for controlling the bridge circuit 3 changes in accordance with the operating state of the motor 42. Generally, the inverter 41 needs to output higher voltages as the rotational speed of the motor 42 increases. The upper limit of the output voltage from the inverter 41 is restricted by the input voltage to the inverter 41, that is, the bus voltage Vdc which is the output from the power converting apparatus 100. A region where the output voltage from the inverter 41 is saturated above the upper limit restricted by the bus voltage Vdc is referred to as an overmodulation region.

In this motor drive apparatus 101, it is not necessary to boost the bus voltage Vdc in the low speed rotation range of the motor 42, that is, in the range below the overmodulation region. On the other hand, when the motor 42 rotates at high speed, the overmodulation region can be shifted to the higher speed rotation side by boosting the bus voltage Vdc. Consequently, the operating range of the motor 42 can be expanded to the high speed rotation side.

If it is not necessary to expand the operating range of the motor 42, the number of turns of the winding to the stator of the motor 42 can be increased accordingly. The increase in the number of turns of the winding increases the motor voltage generated at the two ends of the winding in the low speed rotation region, and the current flowing through the winding is reduced accordingly, which can reduce the loss caused by the switching operation of the switching elements in the inverter 41. In order to obtain the effects of both the expansion of the operating range of the motor 42 and the loss improvement in the low speed rotation region, the number of turns of the winding of the motor 42 is set to an appropriate value.

According to the third embodiment, the power converting apparatus 100 can be used to implement the highly reliable motor drive apparatus 101 that can reduce the unevenness of heat generation between the arms and achieve a high output.

Fourth Embodiment

Figure 34:
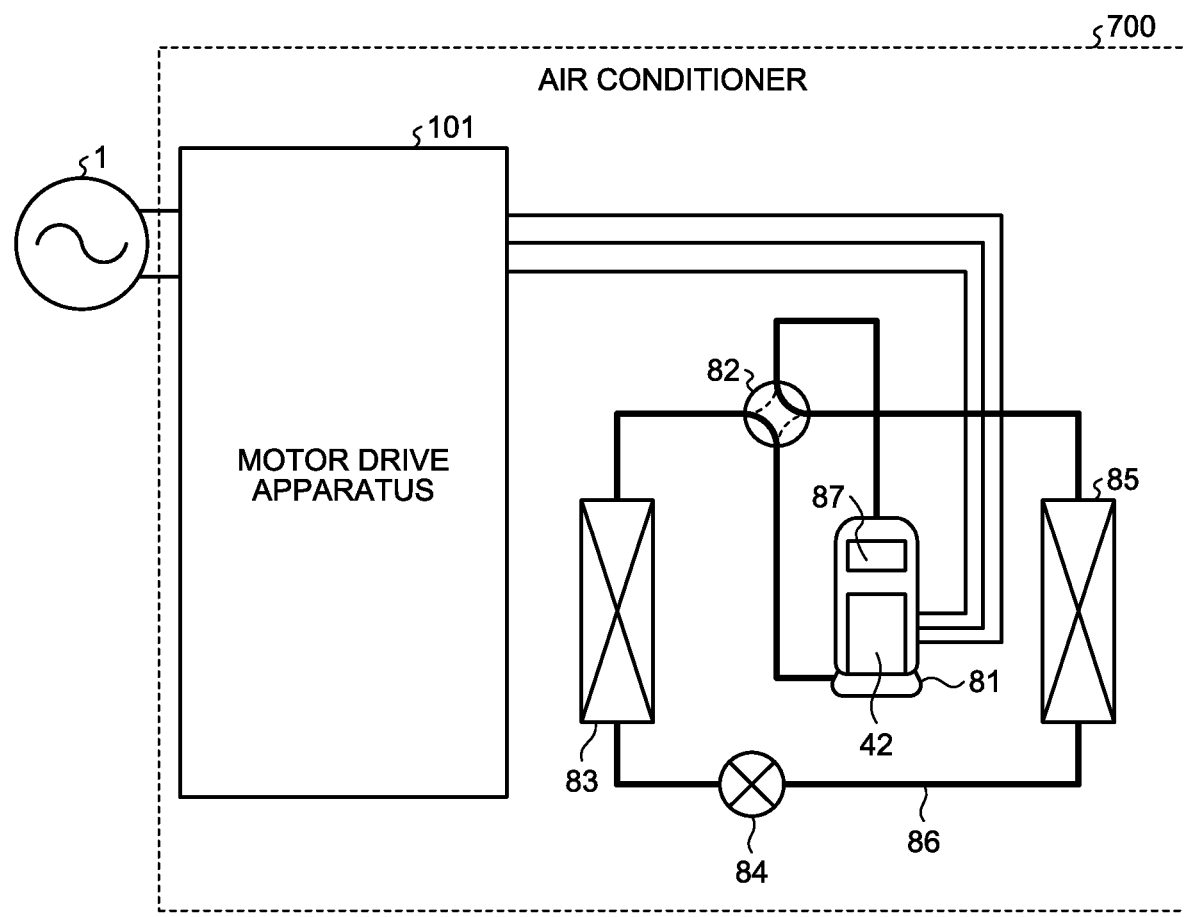
FIG. 34 is a diagram illustrating an exemplary configuration of an air conditioner according to a fourth embodiment.

FIG. 34 is a diagram illustrating an exemplary configuration of an air conditioner according to the fourth embodiment. The air conditioner 700 according to the fourth embodiment is an example of a refrigeration cycle apparatus, and includes the motor drive apparatus 101 and the motor 42 according to the third embodiment. The air conditioner 700 according to the fourth embodiment includes: a compressor 81 incorporating a compression mechanism 87 and the motor 42; a four-way valve 82; an outdoor heat exchanger 83; an expansion valve 84; an indoor heat exchanger 85; and a refrigerant pipe 86. The air conditioner 700 is not limited to a separate type air conditioner in which the outdoor unit is separated from the indoor unit, and may be an integrated type air conditioner in which the compressor 81, the indoor heat exchanger 85, and the outdoor heat exchanger 83 are provided in one housing. The motor 42 is controlled by the motor drive apparatus 101.

Provided inside the compressor 81 are the compression mechanism 87 for compressing a refrigerant and the motor 42 for operating the compression mechanism 87. The refrigerant circulates through the compressor 81, the four-way valve 82, the outdoor heat exchanger 83, the expansion valve 84, the indoor heat exchanger 85, and the refrigerant pipe 86, whereby a refrigeration cycle is established. Note that the components of the air conditioner 700 are also applicable to devices including a refrigeration cycle such as refrigerators or freezers.

In the exemplary configuration described in the fourth embodiment, the motor 42 is used as a drive source for the compressor 81, and the motor 42 is driven by the motor drive apparatus 101. However, the motor 42 may be applied to a drive source for driving an indoor unit blower and an outdoor unit blower (not illustrated) of the air conditioner 700, and the motor 42 may be driven by the motor drive apparatus 101. Alternatively, the motor 42 may be applied to a drive source for the indoor unit blower, the outdoor unit blower, and the compressor 81, and the motor 42 may be driven by the motor drive apparatus 101.

Throughout the year, the air conditioner 700 mainly operates under intermediate conditions in which the output is equal to or less than half the rated output, that is, under low output conditions. As a result, the contribution to the annual power consumption under the intermediate conditions is high. Typically, the rotational speed of the motor 42 of the air conditioner 700 is low, and the bus voltage required to drive the motor 42 is low. For this reason, it is effective to operate the switching elements of the air conditioner 700 in the passive state from the viewpoint of system efficiency. Thus, the power converting apparatus 100 capable of reducing loss in a wide range of operating modes from the passive state to the high frequency switching state is useful for the air conditioner 700. As described above, the interleave method enables the reactor 2 to be reduced in size. However, since the air conditioner 700 often operates under the intermediate conditions, there is no need to reduce the size of the reactor 2, and the configuration and operation of the power converting apparatus 100 according to the first or second embodiment is more effective in terms of harmonic suppression and the power factor of the power supply.

Since the power converting apparatus 100 according to the first or second embodiment can reduce the switching loss, the rise of the temperature of the power converting apparatus 100 is suppressed, which secures the capacity of cooling the substrate mounted in the power converting apparatus 100 even when the size of the outdoor unit blower (not illustrated) is reduced. Thus, the power converting apparatus 100 according to the first or second embodiment is suitable for the air conditioner 700 that is highly efficient and achieves a high output of 4.0 kW or more.

According to the fourth embodiment, since the unevenness of heat generation between the arms is reduced by using the power converting apparatus 100, the reactor 2 can be reduced in size by the high frequency driving of the switching elements, and an increase in the weight of the air conditioner 700 can be prevented. According to the fourth embodiment, the switching loss is reduced by the high frequency driving of the switching elements, and the highly efficient air conditioner 700 with a low energy consumption rate can be acquired.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST 1 alternating-current power supply; 2, 2A reactor; 3 bridge circuit; 4 smoothing capacitor; 5 power supply voltage detecting unit; 6 power supply current detecting unit; 7 bus voltage detecting unit; 10 control unit; 21 power supply current command value control unit; 22 on-duty control unit; 23 power supply voltage phase calculation unit; 24 first pulse generation unit; 25 second pulse generation unit; 26 current command value calculation unit; 27 instantaneous value command value calculation unit; 31 first arm; 32 second arm; 41 inverter; 42 motor; 43 inverter control unit; 44 motor current detecting unit; 50 load; 81 compressor; 82 four-way valve; 83 outdoor heat exchanger; 84 expansion valve; indoor heat exchanger; 86 refrigerant pipe; 87 compression mechanism; 100 power converting apparatus; 101 motor drive apparatus; 201 processor; 202 memory; 241 carrier generation unit; 242 reference PWM generation unit; 243 dead time generation unit; 244 pulse selector; 311, 312, 313, 314, 321, 322 switching element; 311a, 312a, 321a, 322a parasitic diode; 501 first wire; 502 second wire; 503 third wire; 504 fourth wire; 506 first connection point; 508 second connection point; 600 semiconductor substrate; 601, 603 region; 602 oxide insulating film; 604 channel; 700 air conditioner.

The invention claimed is:

1. A power converting apparatus for converting alternating-current power supplied from an alternating-current power supply into direct-current power, the power converting apparatus comprising:
    a first wire and a second wire each connected to the alternating-current power supply;
    a first reactor disposed on the first wire;
    a first arm including a first switching element, a second switching element, and a third wire including a first connection point, the first switching element and the second switching element being connected in series by the third wire, the first connection point being connected to the first reactor by the first wire;
    a second arm connected in parallel with the first arm, the second arm including a third switching element, a fourth switching element, and a fourth wire including a second connection point, the third switching element and the fourth switching element being connected in series by the fourth wire, the second connection point being connected to the alternating-current power supply by the second wire; and
    a capacitor connected in parallel with the second arm, wherein
    loss characteristics per switching event of the first switching element and the second switching element that is better than loss characteristics per switching event of the third switching element and the fourth switching element,
    wherein
    the first arm further includes a fifth switching element and a sixth switching element connected in series,
    the fifth switching element is connected in parallel with the first switching element, and
    the sixth switching element is connected in parallel with the second switching element.

2. The power converting apparatus according to claim 1, wherein switching frequencies of the first switching element and the second switching element are higher than switching frequencies of the third switching element and the fourth switching element.

3. The power converting apparatus according to claim 2, wherein the switching frequencies of the first switching element and the second switching element are higher than 266 times a frequency of the alternating-current power supply.

4. The power converting apparatus according to claim 2, wherein the switching frequencies of the first switching element and the second switching element are higher than 16 kHz.

5. The power converting apparatus according to claim 1, wherein gate resistances of the first switching element and the second switching element are less than gate resistances of the third switching element and the fourth switching element.

6. The power converting apparatus according to claim 1, wherein the first switching element and the second switching element are each formed of a wide bandgap semiconductor.

7. The power converting apparatus according to claim 6, wherein the wide bandgap semiconductor is a gallium nitride semiconductor.

8. The power converting apparatus according to claim 7, wherein the third switching element and the fourth switching element are each formed of a silicon carbide semiconductor.

9. The power converting apparatus according to claim 7, wherein the third switching element and the fourth switching element are super junction metal-oxide-semiconductor field-effect transistors.

10. The power converting apparatus according to claim 7, wherein the switching frequencies of the first switching element and the second switching element are higher than 20 kHz.

11. The power converting apparatus according to claim 1, wherein at least one of the first arm and the second arm is mounted on a 2-in-1 module.

12. The power converting apparatus according to claim 1, further comprising
a current detector for detecting a power supply current output from the alternating-current power supply, wherein
in accordance with the power supply current, it is determined whether to permit the third switching element and the fourth switching element to be turned on.

13. The power converting apparatus according to claim 12, wherein when the power supply current is equal to or less than a threshold, the third switching element and the fourth switching element are not permitted to be turned on, and when the power supply current is larger than the threshold, the third switching element and the fourth switching element are permitted to be turned on.

14. The power converting apparatus according to claim 1, further comprising a second reactor having one end connected to the fifth switching element and the sixth switching element and an opposite end connected to the alternating-current power supply.

15. The power converting apparatus according to claim 1, wherein
the first switching element and the fifth switching element are simultaneously driven, and
the second switching element and the sixth switching element are simultaneously driven.

16. The power converting apparatus according to claim 14, wherein
the first switching element, the second switching element, the fifth switching element, and the sixth switching element are each formed of a wide bandgap semiconductor,
a first chip area is smaller than a second chip area,
the first chip area is an area of one of first chips, each of the first chips being formed of the wide bandgap semiconductor and equipped with one of a plurality of switching elements of the first arm constituted by a plurality of switching element pairs connected in parallel, and
the second chip area is an area of one of second chips, each of the second chips being formed of the wide bandgap semiconductor and equipped with one of a plurality of switching elements of the first arm constituted by one switching element pair.

17. A motor drive apparatus for driving a motor, the motor drive apparatus comprising:
the power converting apparatus according to claim 1; and
an inverter for converting direct-current power output from the power converting apparatus into alternating-current power and outputting the alternating-current power to the motor.

18. An air conditioner comprising:
the motor; and
the motor drive apparatus according to claim 17.

19. The air conditioner according to claim 18, comprising a blower driven by the motor.

* * * * *